United States Patent
Sekiguchi et al.

(10) Patent No.: US 11,695,113 B2
(45) Date of Patent: Jul. 4, 2023

(54) SECONDARY BATTERY, BATTERY PACK, VEHICLE, AND STATIONARY POWER SUPPLY

(71) Applicant: KABUSHIKI KAISHA TOSHIBA, Tokyo (JP)

(72) Inventors: Yumiko Sekiguchi, Kawasaki Kanagawa (JP); Yasuyuki Hotta, Tokyo (JP); Shinsuke Matsuno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 68 days.

(21) Appl. No.: 17/249,354

(22) Filed: Feb. 26, 2021

(65) Prior Publication Data

US 2022/0085366 A1    Mar. 17, 2022

(30) Foreign Application Priority Data

Sep. 16, 2020 (JP) ................. 2020-155674

(51) Int. Cl.
*H01M 4/485* (2010.01)
*H01M 10/42* (2006.01)
(Continued)

(52) U.S. Cl.
CPC ......... *H01M 4/485* (2013.01); *H01M 10/425* (2013.01); *H01M 50/451* (2021.01); *H01M 50/46* (2021.01); *H01M 2004/027* (2013.01); *H01M 2004/028* (2013.01); *H01M 2220/20* (2013.01)

(58) Field of Classification Search
CPC ............... H01M 10/36; H01M 10/425; H01M 2004/027; H01M 2004/028; H01M 2220/10; H01M 2220/20; H01M 2300/0002; H01M 2300/0068; H01M 4/485; H01M 4/525; H01M 50/414; H01M 50/446; H01M 50/451; H01M 50/46; Y02E 60/10
See application file for complete search history.

(56) References Cited

U.S. PATENT DOCUMENTS 10,461,370 B2   10/2019   Hotta et al.
10,720,667 B2   7/2020   Takami et al.
(Continued)

FOREIGN PATENT DOCUMENTS

EP    3 413 391 A1    12/2018
JP    2002-231306 A    8/2002
(Continued)

*Primary Examiner* — Victoria H Lynch
(74) *Attorney, Agent, or Firm* — Finnegan, Henderson, Farabow, Garrett & Dunner, LLP

(57) ABSTRACT

According to one embodiment, provided is a secondary battery including a negative electrode containing a titanium-containing oxide, a positive electrode, a separator between the negative electrode and the positive electrode, a first aqueous electrolyte, a second aqueous electrolyte, and a third aqueous electrolyte. The first aqueous electrolyte is held in the negative electrode and contains 0.001% by mass to 0.5% by mass of zinc ions. The second aqueous electrolyte is held in the separator and contains 1% by mass to 5% by mass of a first compound that includes a hydrophobic portion and a hydrophilic portion. The third aqueous electrolyte is held in the positive electrode.

13 Claims, 10 Drawing Sheets

(51) Int. Cl.
*H01M 50/46* (2021.01)
*H01M 50/451* (2021.01)
*H01M 4/02* (2006.01)

(56) References Cited

U.S. PATENT DOCUMENTS

| | | |
|---|---|---|
| 10,756,392 B2 | 8/2020 | Seki et al. |
| 2019/0088999 A1 | 3/2019 | Sekiguchi et al. |
| 2019/0214687 A1 | 7/2019 | Suyama |

FOREIGN PATENT DOCUMENTS

| | | |
|---|---|---|
| JP | 2013-125629 A | 6/2013 |
| JP | WO2017/135323 A1 | 8/2017 |
| JP | 2018-45966 A | 3/2018 |
| JP | 2018-160342 A | 10/2018 |
| JP | 2018-160443 A | 10/2018 |
| JP | 2019-57373 A | 4/2019 |
| JP | 2019-57388 A | 4/2019 |
| JP | 2019-121537 A | 7/2019 |
| JP | 2020-38818 A | 3/2020 |

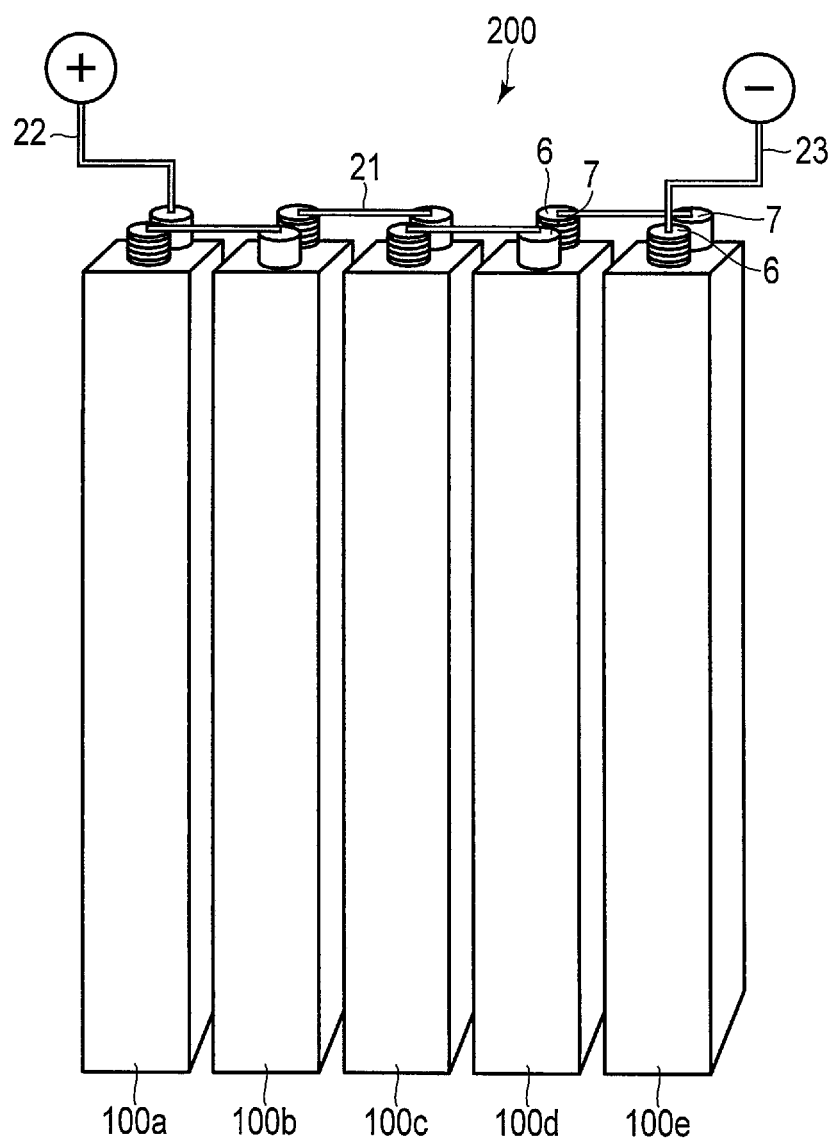
F I G. 9

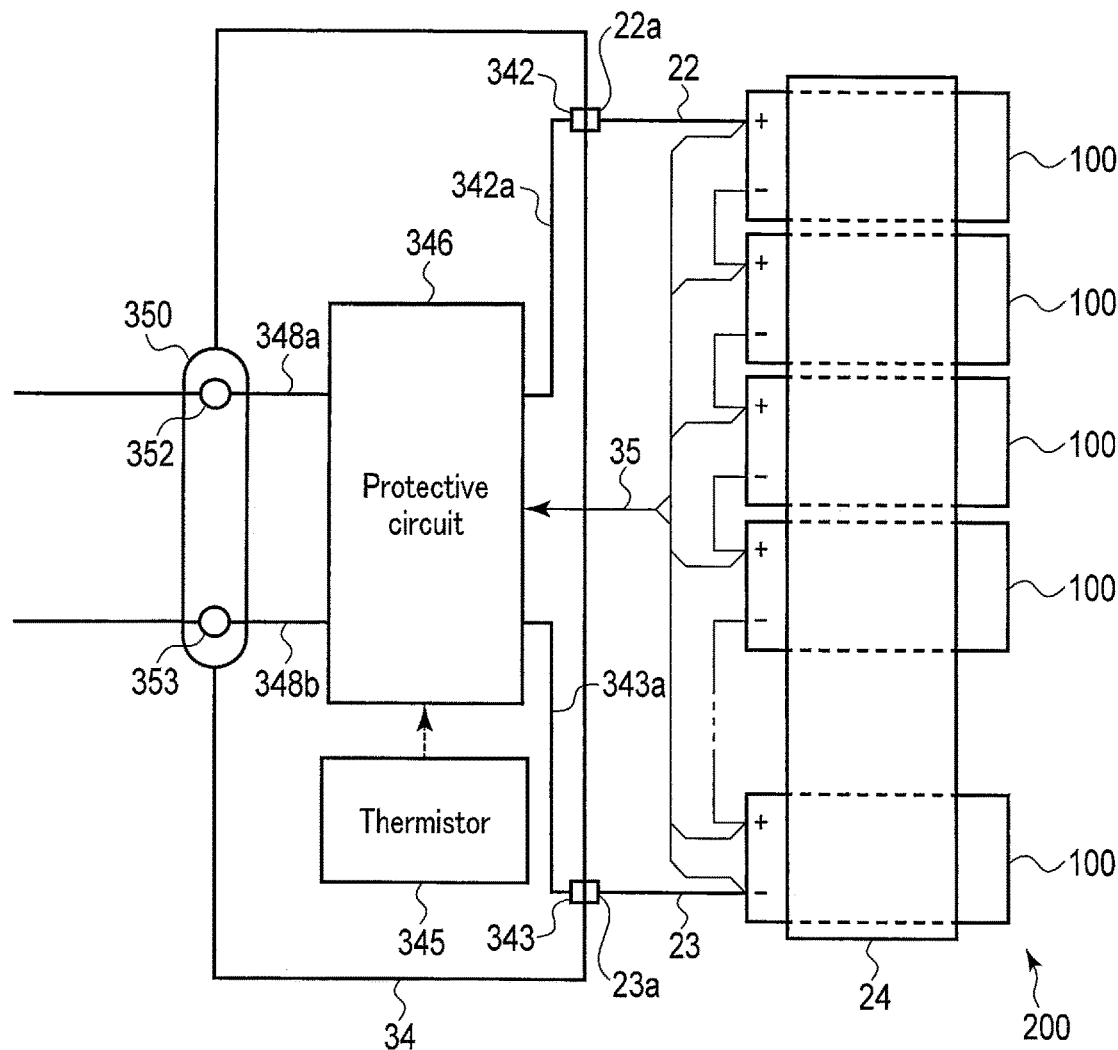
F I G. 12
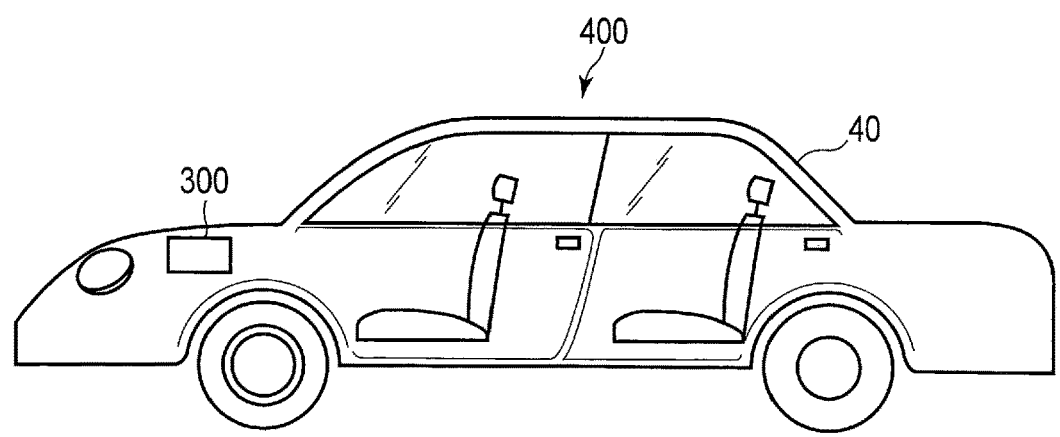
F I G. 13

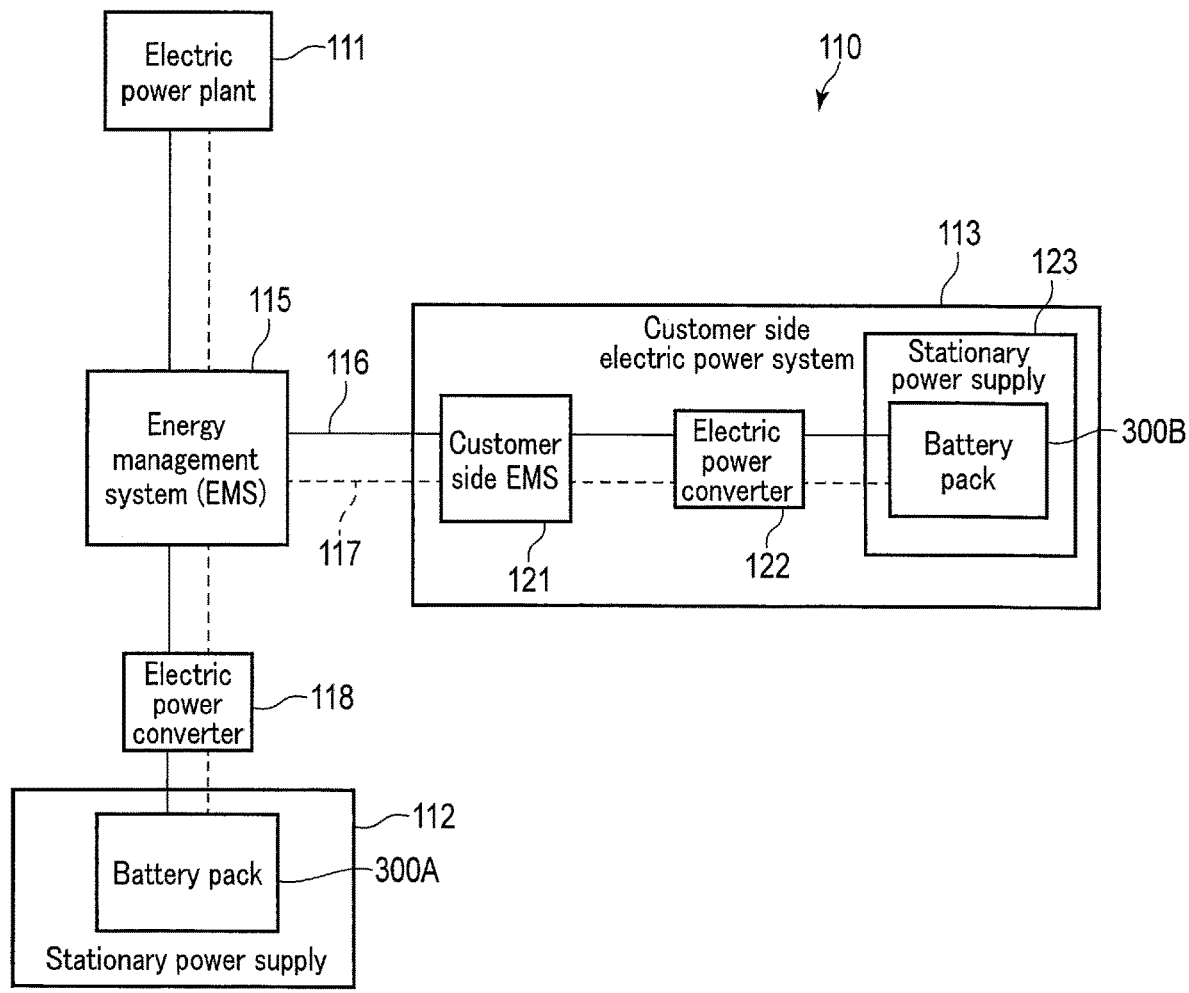
F I G. 14

SECONDARY BATTERY, BATTERY PACK, VEHICLE, AND STATIONARY POWER SUPPLY

CROSS-REFERENCE TO RELATED APPLICATIONS

This application is based upon and claims the benefit of priority from Japanese Patent Application No. 2020-155674, filed Sep. 16, 2020, the entire contents of which are incorporated herein by reference.

FIELD

Embodiments described herein relate generally to a secondary battery, a battery pack, a vehicle, and a stationary power supply.

BACKGROUND

A nonaqueous electrolyte battery formed by using a carbon material or a lithium titanium oxide as a negative electrode active material and a layered oxide that contains nickel, cobalt or manganese as a positive electrode active material, particularly a lithium secondary battery has already been in practical use as a power source in a wide range of fields. Such a nonaqueous electrolyte battery is provided in a variety of forms, such as small-sized batteries for various electronic devices and large-sized batteries for electric automobiles. For an electrolytic solution of the lithium secondary battery, a nonaqueous organic solvent prepared by mixing ethylene carbonate, methylethyl carbonate and the like is used, unlike a nickel-hydrogen battery or a lead storage battery. An electrolytic solution prepared using such a solvent has a higher oxidation resistance and a higher reduction resistance as compared to those of an aqueous electrolytic solution, whereby electrolysis of the solvent hardly occurs. Thus, with a nonaqueous lithium secondary battery, a high electromotive force of from 2 V to 4.5 V is attained.

Meanwhile, many organic solvents are flammable substances. Accordingly, the safety of a secondary battery formed using an organic solvent is theoretically inferior to that of a secondary battery formed using an aqueous solution. In order to improve the safety of a lithium secondary battery formed using an electrolytic solution containing an organic solvent, various countermeasures have been made; however, one cannot be certain that the countermeasures are sufficient. Furthermore, in the production process of the nonaqueous lithium secondary battery, a dry environment is necessary, thereby inevitably increasing the production cost. In addition, the electrolytic solution containing an organic solvent is inferior in electrical conductivity, whereby an internal resistance of the nonaqueous lithium secondary battery is easily increased. Such problems are large defects for applying to use in electric vehicles or hybrid electric vehicles and large-sized storage batteries for stationary energy storage, where there is emphasis on the battery safety and cost.

In order to resolve the problems found in nonaqueous secondary batteries, secondary batteries using an aqueous solution electrolyte have been proposed. However, due to electrolysis of the aqueous solution electrolyte, the active material is apt to fall off the current collector, and therefore, operation of the secondary battery had not stabilized, posing a problem against satisfactory charge and discharge. In order to perform satisfactory charge and discharge, in the case an aqueous solution electrolyte is used, the potential range for performing charge and discharge of the battery must be limited to a potential range at which an electrolysis reaction of water contained as a solvent does not occur. For example, by using a lithium manganese oxide as the positive electrode active material and using a lithium vanadium oxide as the negative electrode active material, electrolysis of aqueous solvent can be avoided. In the case of such a combination, while an electromotive force of from 1 V to 1.5 V can be obtained, an energy density sufficient as a battery is hardly obtained.

As another combination, when a lithium manganese oxide is used as the positive electrode active material and a lithium titanium oxide such as $LiTi_2O_4$ or $Li_4Ti_5O_{12}$ is used as the negative electrode active material, an electromotive force of about 2.6 V to 2.7 V can be theoretically obtained, and the battery may also be attractive from the viewpoint of energy density. With a nonaqueous lithium ion battery adopting such a combination of the positive and negative electrode materials, excellent life performance is obtained and such a battery has already been in practical use.

However, in the aqueous solution electrolyte, a lithium insertion/extraction potential of lithium titanium oxide is about 1.5 V (vs. Li/Li$^+$) based on lithium potential, and thus, electrolysis of the aqueous solution electrolyte easily occurs. For the negative electrode in particular, hydrogen is vigorously generated by electrolysis on the surface of a negative electrode current collector or a metal outer can electrically connected to the negative electrode. Due to an influence thereof, the active material is apt to fall off the current collector. Consequently, operation does not stabilize in such a battery, whereby satisfactory charge-discharge cycle had not been possible.

Many titanium-containing oxides including spinel-type lithium titanium oxide $Li_4Ti_5O_{12}$ (LTO) have lower operating potentials than the electrolysis potential of water. Thus, for example, in a secondary battery using a titanium-containing oxide such as LTO as a negative electrode active material and containing a large amount of water in the electrolytic solution, not only does the negative electrode active material fall off due to bubbles of hydrogen generated by electrolysis of water, but also, an insertion reaction of carriers (for example, alkali metal ions such as lithium ions) into the negative electrode active material and a reduction reaction of protons (hydrogen cation; H$^+$) by electrolysis of water compete. As a result, the charge-discharge efficiency and the discharge capacity of the secondary battery deteriorate.

BRIEF DESCRIPTION OF THE DRAWINGS

FIG. 9 is a perspective view schematically showing an example of the battery module according to an embodiment;

FIG. 12 is a block diagram showing an example of an electric circuit of the battery pack shown in FIG. 11;

FIG. 13 is a partially see-through diagram schematically showing an example of the vehicle according to an embodiment; and FIG. 14 is a block diagram showing an example of a system including the stationary power supply according to an embodiment.

DETAILED DESCRIPTION

Figure 1:
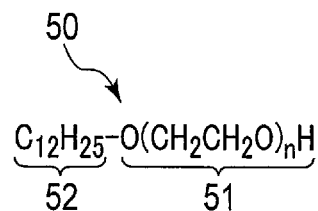
FIG. 1 is a diagram for explaining a calculation method of the HLB (Hydrophilic-Lipophilic Balance) value of polyoxyethylene alkyl ether, using an example chemical formula.

According to one embodiment, provided is a secondary battery including a negative electrode containing a titanium-containing oxide, a positive electrode, a separator between the negative electrode and the positive electrode, a first aqueous electrolyte, a second aqueous electrolyte, and a third aqueous electrolyte. The first aqueous electrolyte is held in the negative electrode and contains 0.001% by mass to 0.5% by mass of zinc ions. The second aqueous electrolyte is held in the separator and contains 1% by mass to 5% by mass of a first compound that includes a hydrophobic portion and a hydrophilic portion. The third aqueous electrolyte is held in the positive electrode.

According to another embodiment, a battery pack including the secondary battery according to the above embodiment is provided.

According to yet another embodiment, a vehicle including the battery pack according to the above embodiment is provided.

According to still another embodiment, a stationary power supply including the battery pack according to the above embodiment is provided.

Hereinafter, embodiments will be described with reference to the drawings. The same reference signs are applied to common components throughout the embodiments and overlapping explanations are omitted. Each drawing is a schematic view for explaining the embodiment and promoting understanding thereof; though there may be differences in shape, size and ratio from those in an actual device, such specifics can be appropriately changed in design taking the following explanations and known technology into consideration.

First Embodiment

According to a first embodiment, a secondary battery including a negative electrode, a positive electrode, a separator, a first aqueous electrolyte, a second aqueous electrolyte, and a third aqueous electrolyte is provided. The negative electrode contains a titanium-containing oxide. The separator is positioned between the negative electrode and the positive electrode. The first aqueous electrolyte is held in the negative electrode. The first aqueous electrolyte contains 0.001% by mass or more and 0.5% by mass or less of zinc ions. The second aqueous electrolyte is held in the separator. The second aqueous electrolyte contains 1% by mass or more and 5% by mass or less of a first compound. The first compound includes a hydrophobic portion and a hydrophilic portion. The third aqueous electrolyte is held in the positive electrode.

In the secondary battery, the first aqueous electrolyte included in the negative electrode contains zinc ions of 0.001% by mass or more and 0.5% by mass or less. The second aqueous electrolyte included in the separator includes the first compound, which includes the hydrophobic portion and the hydrophilic portion in one molecule, of 1% by mass or more and 5% by mass or less. The contents (concentrations) of the zinc ions and the first compound respectively correspond to proportions in mass relative to the masses of aqueous solutions as the first aqueous electrolyte and the second aqueous electrolyte. The separator is desirably hydrophobic. As with the first aqueous electrolyte, the third aqueous electrolyte included in the positive electrode may also contain zinc ions of 0.001% by mass or more and 0.5% by mass or less.

One method for suppressing water decomposition in an electrode may be a method of forming a coating film on the surface of the active material-containing layer of the electrode. As the coating film, a metal coating film containing a metal of a high hydrogen generation overvoltage is known. An example of metals of a high hydrogen generation overvoltage is zinc. However, since the metal coating film tends to have a high density, in other words, tends to be dense, if the metal coating film is too thick, conduction of lithium ions or sodium ions may be inhibited, which may result in degradation of the battery performance. Therefore, it is preferable for the metal coating film to be a thin film; however, formation of a thin uniform coating film on the surface of the active material-containing layer is relatively difficult.

The inventors of the present application have performed extensive research for forming a thin metal coating film on the surface of the active material-containing layer, and as a result, arrived at the secondary battery according to the embodiment.

When the amount of the zinc ions contained in the first aqueous electrolyte falls within a range of 0.001% by mass or more and 0.5% by mass or less, a zinc-containing coating film of a suitable thickness that does not inhibit the conduction of carrier ions, such as lithium ions or sodium ions, is formed in the negative electrode. Therefore, the electrolysis of water can be suppressed without impairing the charge and discharge performance. A more preferable lower limit of the amount of the zinc ions contained in the first aqueous electrolyte is 0.05% by mass. A more preferable upper limit of the amount of the zinc ions contained in the first aqueous electrolyte is 0.45% by mass. It is more preferable that the amount of the zinc ions contained in the first aqueous electrolyte fall within a range of 0.05% by mass or more and 0.45% by mass or less.

When the amount of the first compound contained in the second aqueous electrolyte falls within a range of 0.001% by mass or more and 0.5% by mass or less, the separator can have an appropriate wettability with respect to electrolytes, including the first aqueous electrolyte, the second aqueous electrolyte, and the third aqueous electrolyte. Thus, the conduction of carrier ions can be promoted.

Furthermore, when the content of the zinc ions in the first aqueous electrolyte on the negative electrode side falls within a range of 0.001% by mass to 0.5% by mass, and the content of the first compound in the second aqueous electrolyte in the separator falls within a range of 0.001% by mass to 0.5% by mass, the zinc ions in the first aqueous electrolyte do not permeate through the separator. Therefore, the zinc ion concentration on the negative electrode side is maintained within the aforementioned range, and a zinc-containing coating film of a suitable thickness can be formed in the negative electrode. Since the interaction between the first compound and zinc ions is strong, a composite coating film of the first compound and zinc ions is formed on the surface of the separator. Assumedly, the zinc ions therefore cannot permeate through the separator. Thus, the zinc ion concentration on the negative electrode side does not change, at least on a detectable level.

In other words, in the secondary battery, not only can the conduction of carrier ions be promoted, but the water electrolysis in the negative electrode can be suppressed, also. Accordingly, the secondary battery can achieve an excellent charge-discharge efficiency and a high discharge capacity.

Next, the secondary battery according to the embodiment will be described in detail.

The secondary battery may be, for example, a lithium secondary battery (lithium ion secondary battery). The secondary battery may be, for example, a sodium secondary battery (sodium ion secondary battery). The secondary battery includes an aqueous electrolyte secondary battery containing an aqueous electrolyte (for example, an aqueous solution electrolyte). In other words, the secondary battery may be an aqueous electrolyte lithium ion secondary battery, or an aqueous electrolyte sodium ion secondary battery.

In the secondary battery, the negative electrode, the positive electrode, and the separator can constitute an electrode group. The secondary battery may further include a container member capable of housing the electrode group and the aqueous electrolytes (including, the first aqueous electrolyte, the second aqueous electrolyte, and the third aqueous electrolyte). In addition, the secondary battery may further include a negative electrode terminal electrically connected to the negative electrode and a positive electrode terminal electrically connected to the positive electrode.

Hereinafter, the negative electrode, the positive electrode, the separator, the aqueous electrolyte (including the first, second, and third aqueous electrolytes), the container member, the negative electrode terminal, and the positive electrode terminal will be described in detail. In the following, when the expression "aqueous electrolyte(s)" is used without specifying each of the first aqueous electrolyte, the second aqueous electrolyte, and the third aqueous electrolyte, the expression "aqueous electrolyte(s)" means aqueous electrolytes in general, including the first to third aqueous electrolytes.

(1) Negative Electrode

The negative electrode contains a titanium-containing oxide. The negative electrode may include a negative electrode current collector and a negative electrode active material-containing layer. The titanium-containing oxide may be contained in the negative electrode active material-containing layer as a negative electrode active material.

The negative electrode active material-containing layer is provided on, for example, at least one surface of the negative electrode current collector. The negative electrode active material-containing layer may be provided on one of the principal surfaces of the negative electrode current collector. Alternatively, the negative electrode active material-containing layer may be arranged on one of the principal surfaces of the current collector and the other principal surface on the reverse side.

The negative electrode active material-containing layer may include an electro-conductive agent, a binder, etc. in addition to the negative electrode active material. The electro-conductive agent is added as necessary to improve the current collection performance of the negative electrode and to suppress the contact resistance between the active material and the current collector. The binder has an action of binding the active material, the electro-conductive agent, and the current collector.

At least a part of the surface of the negative electrode active material-containing layer may include a zinc-containing coating film formed of at least one selected from metallic zinc or a zinc compound. The entire area of the surface of the negative electrode active material-containing layer may be coated with a zinc-containing coating film. As described above, when the first aqueous electrolyte included in the negative electrode contains zinc ions within a range of 0.001% by mass to 0.5% by mass, a zinc-containing coating film having a suitable thickness can be formed in the negative electrode. The zinc compound may include, for example, an oxide of zinc, a hydroxide of zinc, a basic carbonate compound of zinc, or a sulfate compound of zinc. An example of the oxide of zinc includes ZnO, an example of the hydroxide of zinc includes $Zn(OH)_2$, an example of the basic carbonate compound of zinc includes $2ZnCO_3 \cdot 3Zn(OH)_2$, and an example of the sulfate compound of zinc includes $ZnSO_4 \cdot 7H_2O$, and the like.

On one hand, by virtue of the zinc ion concentration in the first aqueous electrolyte being 0.001% by mass or more, the zinc containing-coating film formed on the negative electrode has a sufficient thickness, so that the effect of suppressing water decomposition can be exhibited. On the other hand, since the zinc ion concentration in the first aqueous electrolyte is limited to 0.5% by mass or less, the zinc containing-coating film does not become too thick, and insertion and extraction of the lithium ions in and from the negative electrode active material-containing layer does not become hindered. Therefore, when the zinc ion concentration in the first aqueous electrolyte falls within the aforementioned range, the electrolysis of water in the aqueous electrolyte can be suppressed whereby the generation of hydrogen and self-discharge can be suppressed, while the charge-discharge capacity and the charge-discharge efficiency are kept high.

The negative electrode current collector is preferably a foil that contains, for example, at least one selected from the group consisting of aluminum (Al), titanium (Ti) and zinc (Zn). The form of the negative electrode current collector may be, for example, a mesh or a porous body, besides a foil. To increase the energy density and improve the output, the shape of a foil having a small volume and a large surface area is preferable.

A thickness of the negative electrode current collector is preferably in the range of 5 μm to 20 μm. A current collector having such a thickness can keep the strength of the electrode and the reduction of weight in balance.

Also, the negative electrode current collector may include a section on a surface thereof, where the negative electrode active material-containing layer is not disposed thereon. The section can serve as a negative electrode current collecting tab. Alternatively, a negative electrode current collecting tab separate from the negative electrode current collector may be electrically connected to the negative electrode.

A zinc-containing coating film formed of metallic zinc or a zinc compound may be present on at least a part of the surface of the negative electrode current collector. The zinc-containing coating film, which the negative electrode current collector may have on the surface thereof, may be a coating film similar to the zinc-containing coating film that may be present on the surface of the negative electrode active material-containing layer.

As the titanium-containing oxide used for the negative electrode active material, there may be used a compound having a lithium insertion-extraction potential of 1 V (vs. Li/Li$^+$) or greater and 3 V (vs. Li/Li$^+$) or less based on the oxidation-reduction potential of lithium. In the secondary battery according to the embodiment, the zinc-containing coating film is formed on at least a part of the surface of the negative electrode active material-containing layer. Therefore, even if the negative electrode active material includes the titanium-containing oxide having a low potential as mentioned above, charge and discharge can be performed appropriately in the aqueous electrolyte.

As the titanium-containing oxide, an oxide of titanium, lithium titanium composite oxide, monoclinic niobium titanium composite oxide, sodium niobium titanium composite oxide, and the like may be used. The negative electrode active material may include one species or two or more species of titanium-containing oxide.

Examples of the oxide of titanium include titanium oxide having a monoclinic structure, titanium oxide having a rutile structure, and titanium oxide having an anatase structure. For the titanium oxide having each of the crystal structures, the composition before charge can be represented as $TiO_2$ and the composition after charge can be represented as $Li_xTiO_2$ (subscript x is 0≤x≤1). Further, for the titanium oxide having the monoclinic structure, the structure before charge can be represented as $TiO_2$ (B).

Examples of the lithium titanium oxide include a lithium titanium oxide having a spinel structure (e.g., a compound represented by $Li_{4+x2}Ti_5O_{12}$ where −1≤x2≤3), a lithium titanium oxide having a ramsdellite structure (e.g., a compound represented by $Li_{2+x2}Ti_3O_7$ where −1≤x2≤3), a compound represented by $Li_{1+x}Ti_2O_4$ where 0≤x≤1, a compound represented by $Li_{1.1+x}Ti_{1.8}O_4$ where 0≤x≤1, a compound represented by $Li_{1.07+x}Ti_{1.86}O_4$ where 0≤x≤1, and a compound represented by $Li_kTiO_2$ where 0<k≤1. The lithium titanium oxide may be a lithium-titanium composite oxide having a dopant introduced therein.

Examples of the monoclinic niobium titanium composite oxide include a compound represented by $Li_wTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: 0≤w≤5, 0≤y<1, 0≤z<2, and −0.3≤δ≤0.3. Specific examples of the monoclinic niobium titanium composite oxide include $Li_wNb_2TiO_7$ (0≤w≤5).

Another example of the monoclinic niobium titanium composite oxide is a compound represented by $Li_wTi_{1-y}M3_{y+z}Nb_{2-z}O_{7-\delta}$. Here, M3 is at least one selected from the group consisting of Mg, Fe, Ni, Co, W, Ta, and Mo. The respective subscripts in the composition formula are specified as follows: 0≤w≤5, 0≤y<1, 0≤z≤2, and −0.3≤δ≤0.3.

Still other examples of the monoclinic niobium titanium composite oxide include, for example, $Nb_2TiO_7$, $Nb_2Ti_2O_9$, $Nb_{10}Ti_2O_{29}$, $Nb_{14}TiO_{37}$, and $Nb_{24}TiO_{62}$. The monoclinic niobium titanium composite oxide may be a substituted niobium titanium composite oxide, in which at least a part of Nb and/or Ti is substituted with a dopant. Examples of the substituent element include Na, K, Ca, Co, Ni, Si, P, V, Cr, Mo, Ta, Zr, Mn, Fe, Mg, B, Pb, Al, etc. The substituted niobium titanium composite oxide may include one species of substituent element, or may include two or more species of substituent element.

The sodium niobium titanium composite oxide includes, for example an orthorhombic Na-containing niobium titanium composite oxide represented by $Li_{2+d}Na_{2-e}M4_fTi_{6-g-h}Nb_gM5_hO_{14+\delta}$, where 0≤d≤4, 0≤e<2, 0≤f<2, 0<g<6, 0≤h<3, g+h<6, and −0.5≤δ≤0.5, M4 includes one or more selected from the group consisting of Cs, K, Sr, Ba and Ca, and M5 includes one or more selected from the group consisting of Zr, Sn, V, Ta, Mo, W, Fe, Co, Mn, and Al.

As the negative electrode active material, the titanium oxide of anatase structure, the titanium oxide of monoclinic structure, the lithium titanium oxide of spinel structure, or a mixture thereof is preferably used. By combining a negative electrode using such oxides as the negative electrode active material, for example, with a positive electrode using a lithium manganese composite oxide as positive electrode active material, high electromotive force can be obtained.

The negative electrode active material is contained in the negative electrode active material-containing layer, for example, in the form of particles. Negative electrode active material particles may be single primary particles, secondary particles which are aggregates of the primary particles, or a mixture of single primary particles and secondary particles. The shape of the particles is not particularly limited, and may be, for example, a spherical shape, an elliptical shape, a flat shape, a fibrous shape, or the like.

An average particle size of primary particles of the negative electrode active material is preferably 3 μm or smaller, and a more preferable average primary particle size is 0.01 μm or greater and 1 μm or smaller. An average particle size of secondary particles of the negative electrode active material is preferably 30 μm or smaller, and a more preferable average secondary particle size is 5 μm or greater and 20 μm or smaller.

The primary particle size and secondary particle size indicated here means a particle size with which a volume integrated value becomes 50% in a particle size distribution obtained by a laser diffraction particle size distribution measuring apparatus. As the laser diffraction particle size distribution measuring apparatus, Shimadzu SALD-300 is used, for example. For measurement, luminous intensity distribution is measured 64 times at intervals of 2 seconds. As a sample used when performing the particle size distribution measurement, a dispersion obtained by diluting the negative electrode active material particles with N-methyl-2-pyrrolidone such that the concentration becomes 0.1 mass % to 1 mass % is used. Alternatively, a measurement sample obtained by dispersing 0.1 g of a negative electrode active material in 1 ml to 2 ml of distilled water containing a surfactant is used.

The electro-conductive agent is added in order to increase the current-collecting performance and suppress the contact resistance between the active material and the current collector. Examples of the electro-conductive agent include carbonaceous materials such as vapor grown carbon fiber (VGCF), carbon black such as acetylene black, and graphite. Other than that, fibrous carbon materials like carbon nanotubes and carbon nanofibers may be used as the electro-conductive agent. One of these materials may be used as the electro-conductive agent, or two or more of these materials may be combined and used as the electro-conductive agent. Alternatively, instead of using the electro-conductive agent, surfaces of the active material particles may be subjected to carbon coating or electron conductive inorganic material coating.

The binder is added in order to fill gaps between dispersed active materials and to bind the active material and the negative electrode current collector. Examples of the binder include polytetrafluoroethylene (PTFE), polyvinylidene fluoride (PVdF), fluorine rubber, styrene butadiene rubber, polyacrylate compounds, imide compounds, carboxymethyl cellulose (CMC), and salts of the CMC. Other than that, the same polymeric materials as the later-described hydrophobic polymer may be used as the binder. Examples of such polymeric materials include polyvinyl formal, polyvinyl alcohol, polyvinyl acetal, polyvinyl butyral, polymethylmethacrylate, polyvinylidene fluoride, polytetrafluoroethylene and the like. One of these materials may be used as the binder, or two or more of these materials may be combined and used as the binder.

With regard to the blending proportions of the negative electrode active material, electro-conductive agent, and binder in the negative electrode active material-containing layer, it is preferable that the negative electrode active material is within the range of 70% by mass to 95% by mass, the electro-conductive agent is within the range of 3% by mass to 20% by mass, and the binder is within the range of 2% by mass to 10% by mass. When the blending ratio of the electro-conductive agent is 3% by mass or more, current-collecting performance of the negative electrode active material-containing layer can be improved. When the content of the binder is 2% by mass or more, sufficient electrode strength can be obtained. The binder may serve as an insulator; therefore, when the content of the binder is 10% by mass or less, insulating parts within the electrode can be reduced.

The density of the negative electrode active material-containing layer (excluding the current collector) is preferably in the range of 1.8 g/cm$^3$ to 2.8 g/cm$^3$. A negative electrode in which the density of the negative electrode active material-containing layer is within this range is excellent in energy density and retention of the first aqueous electrolyte. The density of the negative electrode active material-containing layer is more preferably in the range of 2.1 g/cm$^3$ to 2.6 g/cm$^3$.

The negative electrode can be produced by, for example, the following method. First, a negative electrode active material, an electro-conductive agent, and a binder are suspended in a solvent to prepare a slurry. The slurry is applied onto one face or both of reverse faces of a negative electrode current collector. Next, the applied slurry is dried to obtain a stack of the negative electrode active material-containing layer and the negative electrode current collector. Then, the stack is pressed. In this manner, a negative electrode is produced.

Alternatively, a negative electrode may be produced by the following method. First, a negative electrode active material, an electro-conductive agent, and a binder are mixed to obtain a mixture thereof. Next, the mixture is molded into a pellet form. Next, by arranging these pellets on the negative electrode current collector, a negative electrode can be obtained.

(2) Positive Electrode

The positive electrode may include a positive electrode current collector and a positive electrode active material-containing layer. The positive electrode active material-containing layer may be provided on a principal surface on one side of the negative electrode current collector or on principal surfaces on both of reverse sides. The positive electrode active material-containing layer may include a positive electrode active material, and optionally an electro-conductive agent and a binder.

As the positive electrode active material, for example, an oxide or sulfide may be used. The positive electrode may contain one species of compound alone as the positive electrode active material or two or more species of compounds in combination. Examples of the oxide or sulfide include a compound capable of having an alkali metal or alkali metal ions be inserted and extracted.

Examples of such compounds include manganese dioxides ($MnO_2$), iron oxides, copper oxides, nickel oxides, lithium manganese composite oxides (e.g., $Li_kMn_2O_4$ or $Li_kMnO_2$; $0<k\leq1$), lithium nickel composite oxides (e.g., $Li_kNiO_2$; $0<k\leq1$), lithium cobalt composite oxides (e.g., $Li_kCoO_2$; $0<k\leq1$), lithium nickel cobalt composite oxides (e.g., $Li_1Ni_{1-j}Co_jO_2$; $0<k\leq1$, $0<j<1$), lithium manganese cobalt composite oxides (e.g., $Li_kMn_jCo_{1-j}O_2$; $0<k\leq1$, $0<j<1$), lithium manganese nickel composite oxides having a spinel structure (e.g., $Li_kMn_{2-j2}Ni_{j2}O_4$; $0<k\leq1$, $0<j2<2$), lithium phosphates having an olivine structure (e.g., $Li_kFePO_4$; $0<k\leq1$, $Li_kFe_{1-j}Mn_jPO_4$; $0<k\leq1$, $0<j<1$, and $Li_kCoPO_4$; $0<k\leq1$), iron sulfates [$Fe_2(SO_4)_3$], vanadium oxides (e.g., $V_2O_5$), and lithium nickel cobalt manganese composite oxide ($Li_kNi_{1-j-i}Co_jMn_iO_2$; $0<k\leq1$, $0<j\leq1$, $0<i<1$, i+j<1).

Among the above compounds, examples of compounds more preferable as the positive electrode active material include lithium manganese composite oxides having a spinel structure (e.g., $Li_kMn_2O_4$; $0<k\leq1$), lithium nickel composite oxides (e.g., $Li_kNiO_2$; $0<k\leq1$), lithium cobalt composite oxides (e.g., $Li_kCoO_2$; $0<k\leq1$), lithium nickel cobalt composite oxides (e.g., $Li_kNi_{1-j}Co_jO_2$; $0<k\leq1$, $0<j<1$), lithium manganese nickel composite oxides having a spinel structure (e.g., $Li_kMn_{2-j2}Ni_{j2}O_4$; $0<k\leq1$, $0<j2<2$), lithium manganese cobalt composite oxides (e.g., $Li_kMn_jCo_{1-j}O_2$; $0<k\leq1$, $0<j<1$), lithium iron phosphates (e.g., $Li_kFePO_4$; $0<k\leq1$), and lithium nickel cobalt manganese composite oxides ($Li_kNi_{1-j-i}Co_jMn_iO_2$; $0<k\leq1$, $0<j<1$, $0<i<1$, j+i<1). When these compounds are used as the positive electrode active material, the positive electrode potential can be increased.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably in the range of 0.1 m$^2$/g to 10 m$^2$/g. A positive electrode active material having the specific surface area of 0.1 m$^2$/g or more can adequately secure insertion/extraction sites of Li ions. A positive electrode active material having the specific surface area of 10 m$^2$/g or less is easy to handle in industrial production and also can ensure charge-and-discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluororubber, polyacrylate compounds, imide compounds, carboxymethyl cellulose (CMC), and salts of CMC. One of these may be used as the binder or a combination of two or more may be used as the binder.

The electro-conductive agent is added to improve current collection performance and to suppress the contact resistance between the positive electrode active material and the positive electrode current collector. Examples of the electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent. The electro-conductive agent may be omitted, as well.

In the positive electrode active material-containing layer, the positive electrode active material and binder are preferably blended in proportions of 80% by mass to 98% by mass, and 2% by mass to 20% by mass, respectively.

By setting the amount of the binder to 2% by mass or more, sufficient electrode strength can be obtained. The binder may also function as an electrical insulator. Thus, if the amount of the binder is set to 20% by mass or less, the amount of electrical insulator contained in the electrode decreases, and thereby internal resistance can be decreased.

When an electro-conductive agent is added, the positive electrode active material, the binder, and the electro-conductive agent are preferably blended in proportions of 77% by mass to 95% by mass, 2% by mass to 20% by mass, and 3% by mass to 15% by mass, respectively.

By setting the amount of the electro-conductive agent to 3% by mass or more, the above effect can be expressed. Also, by setting the amount of the electro-conductive agent to 15% by mass or less, the proportion of the electro-conductive agent in contact with the electrolyte can be reduced. When this proportion is low, decomposition of the electrolyte can be reduced during storage under high temperatures.

The positive electrode current collector is preferably a metal foil of titanium, aluminum, and the like, or an alloy foil of aluminum alloy containing one or more selected from the group consisting of Mg, Ti, Zn, Ni, Cr, Mn, Fe, Cu, and Si.

A thickness of the positive electrode current collector is preferably in the range of 5 μm to 20 μm, and more preferably 15 μm or less.

Also, the positive electrode current collector may include a section on a surface thereof where no positive electrode active material-containing layer is formed. The section can serve as a positive electrode current collecting tab. Alternatively, a positive electrode current collecting tab separate from the positive electrode current collector may be electrically connected to the positive electrode.

The positive electrode can be produced by, for example, the following method. First, a positive electrode active material, an electro-conductive agent, and a binder are suspended in a solvent to prepare a slurry. The slurry is applied to one face or both of reverse faces of a positive electrode current collector. Next, the applied slurry is dried to obtain a stacked of the positive electrode active material-containing layer and the positive electrode current collector. Then, the stack is pressed. In this manner, a positive electrode is produced.

Alternatively, a positive electrode may be produced by the following method. First, a positive electrode active material, an electro-conductive agent, and a binder are mixed to obtain a mixture thereof. Next, the mixture is molded into a pellet form. Next, a positive electrode can be obtained by arranging these pellets on the positive electrode current collector.

(3) Separator

The separator is provided between the negative electrode and the positive electrode, and prevents electrical contact between the negative electrode and the positive electrode.

It is preferable that the separator be basically hydrophobic. If the separator is hydrophobic, supplying of the water molecules from the positive electrode side to the negative electrode side is blocked, since the water molecules hardly permeate through the separator. Therefore, the water decomposition can be further suppressed in the negative electrode by using a hydrophobic separator.

Examples of the hydrophobic separator include polyolefin such as polyethylene and polypropylene. Preferable examples of the separator include a polyolefin porous film. The separator preferably has a porosity of 60% or more. The porous film having a porosity of 60% or more can be well impregnated with the second aqueous electrolyte. Therefore, a battery using such a film along with the second aqueous electrolyte can exhibit a high output performance at a low temperature to a high temperature. In addition, even during storage for a long time in a charged state, during float charging, or when exposed to overcharge, such a film does not react with the negative electrode, and short-circuiting between the negative electrode and the positive electrode caused by precipitation of dendrites of lithium metal does not occur. The more preferable range of the porosity is from 62% to 80%.

Furthermore, as the separator, a membrane including inorganic solid particles and hydrophobic polymers, such as a composite membrane of inorganic solid particles and hydrophobic polymers, or an ion exchange membrane may be used. The inorganic solid particles may be particles of a solid electrolyte, and the membrane may be a solid electrolyte membrane. The solid electrolyte membrane may be a solid electrolyte composite membrane formed of solid electrolyte particles shaped into a membrane using a polymer material, such as hydrophobic polymers. By forming the composite membrane using the hydrophobic inorganic solid particles and hydrophobic polymers, a hydrophobic composite membrane separator can be obtained.

While a separator exhibiting hydrophobicity is obtained by using the separator including the materials mentioned above, it is preferable that the separator have some degree of hydrophilicity. If the separator is completely hydrophobic, the wettability of the separator with respect to the aqueous electrolyte would be low, and thus, the carrier ions (lithium ions, sodium ions, etc.) cannot permeate the separator, whereby the battery performance degrades.

When the second aqueous electrolyte held in the separator contains the first compound, the wettability of the separator with respect to the aqueous electrolyte can be improved by an appropriate degree. That is, the water decomposition in the negative electrode can be suppressed, while also improving the battery performance. The first compound provides effects of improving the wettability of the separator with respect to the aqueous electrolyte, as well as maintaining the zinc ion concentration in the first aqueous electrolyte on the negative electrode side within an appropriate range.

As the first compound, an organic compound including a hydrophilic portion and a hydrophobic portion in one molecule can be used. Specific examples of the hydrophilic portion include an oxyethylene group, an oxyalkylene group, and the like. Specific examples of the hydrophobic portion include an alkyl group.

The first compound can, for example, be adsorbed onto the separator by the hydrophobic portion, and contact the aqueous electrolyte through the hydrophilic portion. Specifically, the hydrophobic portion of the first compound can be adsorbed onto the separator formed of the hydrophobic material, or the hydrophobic polymers or the inorganic solid particles included in the composite membrane as the separator. Accordingly, since the hydrophilicity of the separator is improved by an appropriate level, the wettability of the separator with respect to the aqueous electrolyte is improved.

Therefore, the effect of improving the wettability of the separator with respect to the aqueous electrolyte by the first compound is influenced by a balance between the hydrophobic portion and the hydrophilic portion in the first compound. A hydrophilic-lipophilic balance (HLB) value may be used as an index representing the balance between the hydrophobic portion and the hydrophilic portion in the first compound. The HLB value is an index representing the proportion of the hydrophilic portion in a surfactant, and can be determined as follows: HLB value=20×[molecular weight of hydrophilic portion/total molecular weight]. The first compound preferably has the HLB value of 3 or more and 10 or less. A specific example of a method for calculating an HLB value will be described later.

Furthermore, since the interaction between the first compound and the zinc ions is strong as described above, the first compound and the zinc ions in the aqueous electrolyte can form a composite on the separator surface. Thus, the composite coating film is formed from the first compound and the zinc ions on the separator surface, making the zinc ions unable to permeate through the separator. As a result, the zinc ion concentration in the first aqueous electrolyte on the negative electrode side can be maintained within an appropriate range.

It is more preferable to use a nonionic surfactant as the first compound. Specific examples of the nonionic surfactant include one or more selected from the group consisting of polyoxyethylene alkyl ether and polyoxyalkylene alkyl ether. Polyoxyethylene alkyl ether includes, for example, a compound represented by $C_{12}H_{25}O(CH_2CH_2O)_nH$, where $0.89 < n \leq 2.1$. Polyoxyalkylene alkyl ether includes, for example, a compound represented by $C_{12}H_{25}O[(CH_2CH(CH_3)O)_m \cdot (CH_2CH_2O)_n]H$, where subscript n is $0 < n \leq 35$ and subscript m is $0 < m \leq 40$. Alternatively, polyoxyalkylene alkyl ether includes a compound represented by $C_4H_9O(CH_2CH_2O)_n[CH_2CH(CH_3)O]_mH$, where subscript n is $0 < n \leq 35$ and subscript m is $0 < m \leq 28$, for example.

As specific examples of the method of calculating the HLB value, explained below are calculations methods when using as the first compound, an example of polyoxyethylene alkyl ether $C_{12}H_{25}O(CH_2CH_2O)_nH$ and two examples of polyoxyalkylene alkyl ether $C_{12}H_{25}O[(CH_2CH(CH_3)O)_m \cdot (CH_2CH_2O)_n]H$ and $C_4H_9O(CH_2CH_2O)_n[(CH_2CH(CH_3)O)_m]H$.

Using the chemical formula of polyoxyethylene alkyl ether shown in FIG. 1, a calculation method of the HLB value of the compound is explained. One end of the polyoxyethylene alkyl ether molecule 50 is taken as the hydrophilic portion 51, and the other end is taken as the hydrophobic portion 52. For example, for a compound represented by chemical formula $C_{12}H_{25}O(CH_2CH_2O)_nH$, taken as the hydrophilic portion 51 is the portion ($-O(CH_2CH_2O)_nH$) including the oxyethylene group and the first oxygen in the chemical formula. The molecular weight of this portion is used as "molecular weight of hydrophilic portion" in the above equation for calculating the HLB value. The alkyl group ($C_{12}H_{25}-$) in the chemical formula is taken as the hydrophobic portion 52. The molecular weight of the entire compound (the whole molecule 50) including the hydrophilic portion 51 and the hydrophobic portion 52 is used as "total molecular weight" in the above equation for calculating the HLB value.

Figure 2:
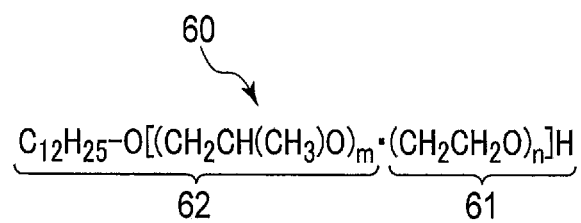
FIG. 2 is a diagram for explaining a calculation method of the HLB value of polyoxyalkylene alkyl ether, using an example chemical formula.

Using the chemical formula of the polyoxyalkylene alkyl ether shown in FIG. 2, a calculation method of the HLB value of the compound is explained. One end of the polyoxyalkylene alkyl ether molecule 60 is taken as the hydrophilic portion 61, and the other end is taken as the hydrophobic portion 62. For a compound represented by chemical formula $C_{12}H_{25}O[(CH_2CH(CH_3)O)_m \cdot (CH_2CH_2O)_n]H$, for example, taken as the hydrophilic portion 61 is an end ($-(CH_2CH_2O)_nH$) including an ethylene oxide unit within the oxyalkylene group ($-[(CH_2CH(CH_3)O)_m \cdot (CH_2CH_2O)_n]H$) in the chemical formula. The molecular weight of this portion is used as "molecular weight of hydrophilic portion" in the above equation for calculating the HLB value. Taken as the hydrophobic portion 62 is an end ($C_{12}H_{25}-O(CH_2CH(CH_3)O)_m-$) from the alkyl group ($C_{12}H_{25}-$) to the propylene oxide unit ($-O(CH_2CH(CH_3)O)_m-$) included in the oxyalkylene group in the chemical formula. The molecular weight of the entire compound (the whole molecule 60) including the hydrophilic portion 61 and the hydrophobic portion 62 is used as "total molecular weight" in the above equation for calculating the HLB value.

Figure 3:
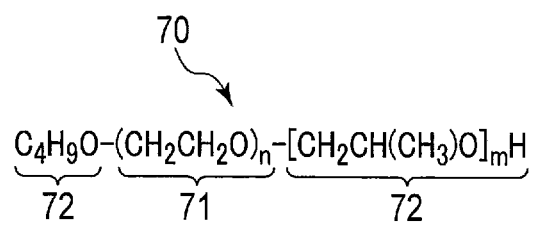
FIG. 3 is a diagram for explaining the calculation method of the HLB value of polyoxyalkylene alkyl ether, using another example chemical formula.

A calculation method of the HLB value of another example of polyoxyalkylene alkyl ether is explained with reference to FIG. 3. For polyoxyalkylene alkyl ether represented by chemical formula $C_4H_9O(CH_2CH_2O)_n[CH_2CH(CH_3)O]_mH$, both ends of the molecule 70 are taken as the hydrophobic portion 72, and a portion between these ends is taken as the hydrophilic portion 71. For example, each of the alkyl group ($C_4H_9-$) on one side and the end including the oxypropylene group ($-[CH_2CH(CH_3)O]_mH$) on the other side in the chemical formula is taken as the hydrophobic portion 72. A portion corresponding to the oxyethylene group ($-(CH_2CH_2O)_n-$), which is present therebetween is taken as the hydrophilic portion 71. The molecular weight of the portion corresponding to the hydrophilic portion 71 is used as "molecular weight of hydrophilic portion" in the above equation for calculating the HLB value. The molecular weight of the entire compound (the whole molecule 70) including the hydrophilic portion 71 and the hydrophobic portions 72 is used as "total molecular weight" in the above equation for calculating the HLB value.

The molecular weight of the first compound preferably falls within a range of 200 or more and 4000 or less, more preferably falls within a range of 400 or more and 3500 or less, and even more preferably falls within a range of 1000 or more and 3000 or less. The molecular weight of the first compound can be measured by a method described later.

One compound may be used alone as the first compound. Alternatively, two or more compounds may be used as the first compound. Even when one compound is used alone as the first compound, the effect mentioned above can be exhibited.

The first compound may contain alcohol that is a raw material of the first compound or polyether polyol, which is a by-product.

The first compound can be made to be included in the hydrophobic separator by performing preprocessing as described below, for example, before an electrode group is produced. The separator is immersed in an aqueous solution including the first compound and an electrolyte. As the aqueous solution used here, for example, the second aqueous electrolyte is used.

The first compound cannot be made to be included inside the hydrophobic separator described above merely by, for example, injecting an electrolyte solution containing the first compound in between the separator and the electrode when producing a battery. The first compound cannot be made to be included inside the hydrophobic separator by injecting an electrolyte solution containing the first compound in between the separator and the electrode when producing a battery, and placing the battery under a reduced pressure for a certain period of time, namely, by the so-called vacuum impregnation, either.

The separator preferably has a thickness of 20 μm or more and 100 μm or less, and a density of 0.2 g/cm$^3$ or more and 0.9 g/cm$^3$ or less. In this range, the mechanical strength and the reduction of the battery resistance are well balanced, whereby, there can be provided a secondary battery with high output and having internal short circuit suppressed. Furthermore, since there is little thermal contraction of the separator in a high temperature environment, an excellent high-temperature storage performance can be provided.

In the case of using a composite membrane as the separator, the thickness of the composite membrane is preferably 3 μm or greater, more preferably 5 μm or greater, and even more preferably 7 μm or greater, from the viewpoint of suppression of an internal short circuit. In addition, the thickness of the composite membrane is preferably 50 μm or less, more preferably 30 μm or less, and even more preferably 20 μm or less, from the viewpoint of increase of the ion conductivity and the energy density.

The coefficient of air permeability of the separator is preferably $1\times10^{-14}$ m$^2$ or less. When the coefficient of air permeability is greater than $1\times10^{-4}$ m$^2$, the first aqueous electrolyte on the negative electrode side, the second aqueous electrolyte in the separator, and the third aqueous electrolyte on the positive electrode side may become mixed. When the aqueous electrolytes are able to interexchange between the positive and negative electrodes due to a large coefficient of air permeability of the separator, because liquid shortage of the aqueous electrolyte may easily occur in the electrode of a smaller osmotic pressure, too great a coefficient of air permeability is not preferable. In addition, a separator having a smaller coefficient of air permeability tends to have a higher hydrophobicity. Therefore, a separator having a lower coefficient of air permeability can more easily produce the effect of improving the wettability of the separator with respect to the aqueous electrolyte by adsorption of the first compound.

The coefficient of air permeability is more preferably $1\times10^{-15}$ m$^2$ or smaller, and even more preferably $1\times10^{-16}$ m$^2$ or smaller. The separator having such a coefficient of air permeability is desirable, because the mixing of the first to third aqueous electrolytes can be sufficiently suppressed kinetically, and accordingly, the coulomb efficiency is improved. This is because the rate performance is improved, since the second aqueous electrolyte sufficiently permeates the separator, whereby the electrical resistance is reduced and the ion conductivity is increased in the separator. The aqueous electrolytes permeate well in the separator, but not so much that the first to third aqueous electrolytes mix. A method for calculating the coefficient of air permeability will be described later.

As inorganic solid particles contained in the composite membrane as the separator, examples include oxide-based ceramics such as alumina, silica, zirconia, yttria, magnesium oxide, calcium oxide, barium oxide, strontium oxide, and vanadium oxide, carbonates and sulfates such as sodium carbonate, potassium carbonate, magnesium carbonate, calcium carbonate, barium carbonate, lanthanum carbonate, cerium carbonate, calcium sulfate, magnesium sulfate, aluminum sulfate, gypsum, and barium sulfate, phosphates such as hydroxyapatite, lithium phosphate, zirconium phosphate, and titanium phosphate, and nitride-based ceramics such as silicon nitride, titanium nitride, and boron nitride. The inorganic particles mentioned above may be in the form of a hydrate.

The inorganic solid particles preferably include solid electrolyte particles having ion conductivity of alkali metal ions. Specifically, inorganic solid electrolyte particles having ion conductivity with respect to lithium ions and sodium ions are more preferable. By using such an inorganic solid electrolyte particle, a separator having lithium ion conductivity or sodium ion conductivity can be obtained.

Examples of the inorganic solid particles exhibiting lithium ion conductivity include an oxide-based solid electrolyte or a sulfide-based solid electrolyte. The oxide-based solid electrolyte is preferably a lithium phosphate solid electrolyte having a NASICON (Sodium (Na) Super Ionic Conductor) structure and which is represented by a general formula $Li_{1+x3}M_2(PO_4)_3$. M in the above-described general formula is, for example, one or more selected from the group consisting of titanium (Ti), germanium (Ge), strontium (Sr), zirconium (Zr), tin (Sn), aluminum (Al), and calcium (Ca). The subscript x3 is within the range of $0 \leq x3 \leq 2$. The lithium phosphate solid electrolyte represented by the general formula $Li_{1+x3}M_2(PO_4)_3$ has an ionic conductivity of, for example, $1\times10^{-7}$ S/cm to $1\times10^{-3}$ S/cm.

Specific examples of the lithium phosphate solid electrolyte having the NASICON structure include a compound represented by $Li_{1-x}Al_vMe_{2-v}(PO_4)_3$ where Me is one or more selected from the group consisting of Ti, Ge, Sr, Zr, Sn, and Ca, $0 \leq x \leq 1$, and $0 \leq v \leq 1$; a LATP compound represented by $Li_{1+x4}Al_{x4}Ti_{2-x4}(PO_4)_3$ where $0.1 \leq x4 \leq 0.5$; a compound represented by $Li_{1+x3}Al_{x3}Ge_{2-x3}(PO_4)_3$ where $0 \leq x3 \leq 2$; a compound represented by $Li_{1+x3}Al_{x3}Zr_{2-x3}(PO_4)_3$ where $0 \leq x3 \leq 2$; a compound represented by $Li_{1+v2+u}Al_{v2}M\alpha_{2-v2}Si_uP_{3-u}O_{12}$ where Mα is one or more selected from the group consisting of Ti and Ge, $0 < v2 \leq 2$, and $0 \leq u < 3$; and a compound represented by $Li_{1+2t}Zr_{1-t}Ca_t(PO_4)_3$ where $0 \leq t < 1$. $Li_{1+2t}Zr_{1-t}Ca_t(PO_4)_3$ is preferably used as inorganic solid electrolyte particles because of its high water-resistance, low reducing ability, and low cost.

In addition to the above lithium phosphoric acid solid electrolyte, examples of the oxide-base solid electrolyte include amorphous LIPON compounds represented by $Li_pPO_qN_r$ where $2.6 \leq p \leq 3.5$, $1.9 \leq q \leq 3.8$, and $0.1 \leq r \leq 1.3$ (e.g., $Li_{2.9}PO_{3.3}N_{0.46}$); a compound having a garnet structure and represented by $La_{5+s}A_sLa_{3-s}M\beta_2O_{12}$ where A is one or more selected from the group consisting of Ca, Sr, and Ba, Mβ is one or more selected from the group consisting of Nb and Ta, and $0 \leq s \leq 0.5$; a compound represented by $Li_3M\gamma_{2-s}L_2O_{12}$ where Mγ is one or more selected from the group consisting of Ta and Nb, and L may include Zr, and $0 \leq s \leq 0.5$; a compound represented by $Li_{7-3s}Al_sLa_3Zr_3O_{12}$ where $0 \leq s \leq 0.5$; and a LLZ compound represented by $Li_{5+x3}La_3M\delta_{2-x3}Zr_{x3}O_{12}$ where Mδ is one or more selected from the group consisting of Nb and Ta, and $0 \leq x3 \leq 2$ (e.g., $Li_7La_3Zr_2O_{12}$). One species of the solid electrolyte or a mixture of two or more species thereof may be used. LIPON has an ionic conductivity of, for example, $1\times10^{-7}$ S/cm to $5\times10^{-6}$ S/cm. LLZ has an ionic conductivity of, for example, $1\times10^{-7}$ S/cm to $5\times10^{-4}$ S/cm.

Further, as the solid electrolyte particles having ion conductivity of sodium ions, sodium-containing solid electrolytes may be used. The sodium-containing solid electrolytes are excellent in ion conductivity of sodium ions. Examples of the sodium-containing solid electrolyte include β-alumina, sodium phosphate sulfides, sodium phosphates, and the like. The sodium ion-containing solid electrolyte is preferably in the form of glass-ceramic.

The inorganic solid particles are preferably a solid electrolyte having a lithium ion conductivity of $1 \times 10^{-7}$ S/cm or more at 25° C. The lithium ion conductivity can be measured by, for example, the alternating-current impedance method. Details will be explained later.

Shapes of the inorganic solid particles are not particularly limited, but may be, for example, spherical, elliptical, flat, fibrous, or the like.

The average particle size of the inorganic solid particles is preferably 15 μm or less, and is more preferably 12 μm or less. When the inorganic solid particles have a small average particle size, the denseness of the composite membrane can be made high.

The average particle size of the inorganic solid particles is preferably 0.01 μm or more, and is more preferably 0.1 μm or more. When the inorganic solid particles have a large average particle size, aggregation of the particles tends to be suppressed.

The average particle size of the inorganic solid particles refers to a particle size at which a cumulative volume is 50% in a particle-size distribution obtained by a laser diffraction particle size analyzer. As a sample for this particle size analysis, a dispersion solution having the inorganic solid particles diluted with ethanol in a concentration of 0.01% by mass to 5% by mass is used.

In the composite membrane, a single species of inorganic solid particles may be used or plural species of inorganic solid particles may be used in mixture.

In the composite membrane, the inorganic solid particles are preferably the main component. The proportion of the inorganic solid particles in the composite membrane is preferably 70% by mass or more, more preferably 80% by mass or more, and still more preferably 85% by mass or more from the viewpoint of enhancing the ion conductivity of the composite membrane. The proportion of the inorganic solid particles in the composite membrane is preferably 98% by mass or less, more preferably 95% by mass or less, and still more preferably 90% by mass or less from the viewpoint of increasing the membrane strength of the composite membrane. The proportion of the inorganic solid particles in the composite membrane can be calculated by thermogravimetric (TG) analysis.

The hydrophobic polymer contained in the composite membrane enhances the binding between the inorganic solid particles. The weight-average molecular weight of the hydrophobic polymer is, for example, 3,000 or more. When the weight-average molecular weight of the hydrophobic polymer is 3,000 or more, the binding of the inorganic solid particles can be further enhanced. The weight-average molecular weight of the hydrophobic polymer is preferably 3,000 to 5,000,000, more preferably 5,000 to 2,000,000, and further preferably 10,000 to 1,000,000. The weight-average molecular weight of the hydrophobic polymer can be obtained by gel permeation chromatography (GPC).

Examples of the hydrophobic polymer include polymeric materials such as of polyether-base, polyester-base, polyamine-base, polyethylene-base, and polysulfide-base. The hydrophobic polymer may be a polymer made of a single monomer unit, a copolymer made of plural monomer units, or a mixture thereof. The hydrophobic polymer preferably contains a monomer unit constituted by a hydrocarbon having a functional group including one or more selected from the group consisting of oxygen (O), sulfur (S), nitrogen (N), and fluorine (F). In the hydrophobic polymer, the proportion of a portion formed from the monomer unit is preferably 70 mol % or more. Such a monomer unit will be referred to as a first monomer unit hereinafter. Additionally, in a copolymer, a monomer unit other than the first monomer unit will be referred to as a second monomer unit. The copolymer of the first monomer unit and the second monomer unit may be an alternating copolymer, a random copolymer, or a block copolymer.

When the proportion occupied by the portion formed of the first monomer unit in the polymeric material is lower than 70 mol %, there is concern that the water shielding property of the composite membrane decreases. The proportion of the portion formed from the first monomer unit in the hydrophobic polymer is preferably 90 mol % or more. Most preferably, the proportion of the portion formed from the first monomer unit in the hydrophobic polymer is preferably 100 mol %, that is, the hydrophobic polymer is most preferably a polymer formed from only the first monomer unit.

The first monomer unit may be a compound whose side chain has a functional group including one or more selected from the group consisting of oxygen (O), sulfur (S), nitrogen (N), and fluorine (F) and whose main chain is formed from carbon-carbon bonds. The hydrocarbon may have one or more functional groups each including one or more elements selected from the group consisting of oxygen (O), sulfur (S), nitrogen (N), and fluorine (F). The functional group in the first monomer unit enhances the conductivity of alkali metal ions passing through the composite membrane.

The hydrocarbon that forms the first monomer unit preferably has a functional group including one or more selected from the group consisting of oxygen (O), sulfur (S), and nitrogen (N). When the first monomer unit has such a functional group, the conductivity of alkali metal ions in the composite membrane tends to be further enhanced and the internal resistance tends to decrease.

The functional group contained in the first monomer unit preferably includes one or more selected from the group consisting of a formal group, a butyral group, a carboxymethyl ester group, an acetyl group, a carbonyl group, a hydroxyl group, and a fluoro group. In addition, the first monomer unit preferably contains at least one of a carbonyl group and a hydroxyl group in the functional group, and more preferably contains both.

The first monomer unit can be represented by the following formula.

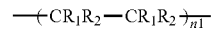

In the formula, $R_1$ is preferably selected from the group consisting of hydrogen (H), an alkyl group, and an amino group. In addition, $R_2$ is preferably selected from the group consisting of a hydroxyl group (—OH), —$OR_1$, —$COOR_1$, —$OCOR_1$, —$OCH(R_1)O$—, —CN, —$N(R_1)_3$, and —$SO_2R_1$.

Examples of the first monomer unit include one or more selected from the group consisting of vinyl formal, vinyl alcohol, vinyl acetate, vinyl acetal, vinyl butyral, acrylic acid and derivatives thereof, methacrylic acid and derivatives thereof, acrylonitrile, acrylamide and derivatives thereof, styrene sulfonic acid, polyvinylidene fluoride, and tetrafluoroethylene.

The hydrophobic polymer preferably contains one or more selected from the group consisting of polyvinyl formal, polyvinyl alcohol, polyvinyl acetal, polyvinyl butyral, polymethyl methacrylate, polyvinylidene fluoride, and polytetrafluoroethylene.

Examples of structural formulas of compounds usable as the hydrophobic polymer will be described below.

The structural formula of polyvinyl formal is as follows. In the formula, preferably, a is 50 to 80, b is 0 to 5, and c is 15 to 50.

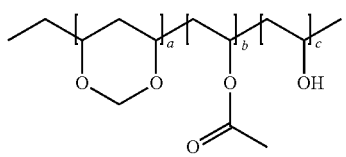

The structural formula of polyvinyl butyral is as follows. In the formula, preferably, l is 50 to 80, m2 is 0 to 10, and n2 is 10 to 50.

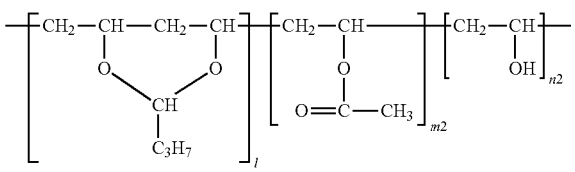

The structural formula of polyvinyl alcohol is as follows. In the formula, preferably, n3 is 70 to 20,000.

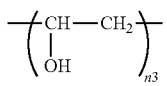

The structural formula of polymethyl methacrylate is as follows. In the formula, preferably, n4 is 30 to 10,000.

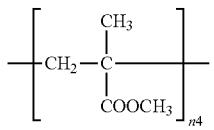

The second monomer unit is a compound other than the first monomer unit, that is, a compound that does not have a functional group including one or more selected from the group consisting of oxygen (O), sulfur (S), nitrogen (N), and fluorine (F), or a compound that has the functional group but is not a hydrocarbon. Examples of the second monomer unit include ethylene oxide and styrene. Examples of a polymer formed from the second monomer unit include polyethylene oxide (PEO) and polystyrene (PS).

The species of the functional groups included in the first monomer unit and the second monomer unit can be identified by infrared spectroscopy (Fourier Transform Infrared Spectroscopy: FT-IR). Whether the first monomer unit is formed from a hydrocarbon can be determined by nuclear magnetic resonance (NMR). In the copolymer of the first monomer unit and the second monomer unit, the proportion occupied by the portion formed from the first monomer unit can be calculated by NMR.

The hydrophobic polymer may contain an aqueous electrolyte. The proportion of the aqueous electrolyte that the hydrophobic polymer may contain can be grasped based on a water absorption capacity thereof. Here, the water absorption capacity of the hydrophobic polymer is given by a value ($[M_p'-M_p]/M_p \times 100$), where the hydrophobic polymer is immersed in water at a temperature of 23° C. for 24 hours, and a value obtained by subtracting a mass $M_p$ of the hydrophobic polymer before immersion from a mass $M_p'$ of the polymeric material after immersion is divided by the mass $M_p$ of the hydrophobic polymer before immersion. The water absorption capacity of the hydrophobic polymer is considered to be associated with the polarity of the hydrophobic polymer.

When a hydrophobic polymer having a high water absorption capacity is used, the alkali metal ion conductivity of the composite membrane tends to be higher. In addition, when a hydrophobic polymer having a high water absorption capacity is used, the binding force between the inorganic solid particles and the hydrophobic polymer increases and the flexibility of the composite membrane can be enhanced. The water absorption capacity of the hydrophobic polymer is preferably 0.01% or more, more preferably 0.5% or more, and further preferably 2% or more.

When a hydrophobic polymer having a low water absorption capacity is used, the strength of the composite membrane can be enhanced. In other words, when the water absorption capacity of the hydrophobic polymer is too high, the composite membrane may swell due to the aqueous electrolyte, in some cases. In addition, when the water absorption capacity of the hydrophobic polymer is too high, the hydrophobic polymer in the composite membrane may flow out into the aqueous electrolyte. The water absorption capacity of the hydrophobic polymer is preferably 15% or less, more preferably 10% or less, further preferably 7% or less, and particularly preferably 3% or less.

The proportion of the hydrophobic polymer in the composite membrane is preferably 1% by mass or more, more preferably 3% by mass or more, and still more preferably 10% by mass or more from the viewpoint of enhancing the flexibility of the composite membrane. In addition, the denseness of the composite oxide tends to be higher when the proportion of the hydrophobic polymer is greater.

In addition, the proportion of the hydrophobic polymer in the composite membrane is preferably 20% by mass or less, more preferably 10% by mass or less, and still more preferably 5% by mass or less from the viewpoint of enhancing the carrier ion conductivity of the composite membrane. The proportion of the hydrophobic polymer in the composite membrane can be calculated by thermogravimetric (TG) analysis.

As the hydrophobic polymer to be included in the composite membrane, a single species of hydrophobic polymer may be used or plural species of hydrophobic polymers may be used in mixture.

The composite membrane may contain a plasticizer and an electrolyte salt in addition to the inorganic solid particles and the hydrophobic polymer. For example, when the composite membrane contains an electrolyte salt, the alkali metal ion conductivity of the composite membrane can be further enhanced.

As the separator, there may be used a composite solid electrolyte membrane that includes a composite layer including the solid electrolyte described above and the hydrophobic polymer material described above, and a porous self-supported film. The porous self-supported film includes a self-supported film formed of polyolefin, such as polyethylene or polypropylene, described above, or a cellulose.

(4) Aqueous Electrolyte

The secondary battery according to the embodiment includes an aqueous electrolyte. The aqueous electrolyte may be held at least partially by the electrode group. The aqueous electrolyte includes the first aqueous electrolyte, the second aqueous electrolyte, and the third aqueous electrolyte. The first aqueous electrolyte is held by the negative electrode. The second aqueous electrolyte is held by the separator. The third aqueous electrolyte is held by the positive electrode. In the following, unless otherwise specified, the expression "aqueous electrolyte(s)" means general aqueous electrolytes, including the first aqueous electrolyte, the second aqueous electrolyte, and the third aqueous electrolyte.

The aqueous electrolyte contains at least an aqueous solvent and an electrolyte salt. The first aqueous electrolyte included in the negative electrode further contains zinc ions. The first aqueous electrolyte may further contain the first compound. The second aqueous electrolyte included in the separator further contains the first compound. The second aqueous electrolyte may also contain zinc ions. The third aqueous electrolyte included in the positive electrode may further contain zinc ions and/or the first compound.

The aqueous electrolyte is, for example, liquid. The liquid aqueous electrolyte is an aqueous solution prepared by dissolving an electrolyte salt as solute in an aqueous solvent. In the aqueous solution, the aqueous solvent amount is preferably 1 mol or more, and more preferably 3.5 mol or more, with respect to 1 mol of salt as solute.

As the aqueous solvent, a solution including water can be used. The solution including water may be pure water, or may be a mixed solvent of water and an organic solvent. The proportion of water included in the aqueous solvent is, for example, 50% by volume or more, and preferably, 90% by volume or more.

The aqueous electrolyte may be a gel electrolyte. The gel electrolyte is prepared by mixing the above-described liquid aqueous electrolyte and a polymeric compound to obtain a composite. As the polymeric compound, for example, polyvinylidene fluoride (PVdF), polyacrylonitrile (PAN), polyethylene oxide (PEO), and the like may be used.

Whether the aqueous electrolyte contains water can be examined by GC-MS (Gas Chromatography-Mass Spectrometry). In addition, the salt concentration and the water content in the aqueous electrolyte can be measured by, for example, ICP (Inductively Coupled Plasma) emission spectrometry. The molar concentration (mol/L) can be calculated by measuring a predetermined amount of aqueous electrolyte and calculating the concentration of contained salt. In addition, the number of moles of the solute and the solvent can be calculated by measuring the specific gravity of the aqueous electrolyte.

As the electrolyte salt, for example, lithium salts, sodium salts, and mixtures thereof may be used.

As the lithium salt, for example, lithium chloride (LiCl), lithium bromide (LiBr), lithium hydroxide (LiOH), lithium sulfate ($Li_2SO_4$), lithium nitrate ($LiNO_3$), lithium acetate ($CH_3COOLi$), lithium oxalate ($Li_2C_2O_4$), lithium carbonate ($Li_2CO_3$), lithium bis(trifluoromethanesulfonyl)imide (LiTFSI; $LiN(SO_2CF_3)_2$), lithium bis(fluorosulfonyl)imide (LiFSI; $LiN(SO_2F)_2$), lithium bis(oxalate)borate (LiBOB: $LiB[(OCO)_2]_2$), and the like may be used.

As the sodium salt, for example, sodium chloride (NaCl), sodium sulfate ($Na_2SO_4$), sodium hydroxide (NaOH), sodium nitrate ($NaNO_3$), sodium trifluoromethanesulfonylamide (NaTFSA), and the like may be used.

The mol concentration of lithium ions and sodium ions in the aqueous electrolyte is preferably 3 mol/L or more, preferably 6 mol/L or more, and preferably 12 mol/L or more. When the concentration of lithium ions and sodium ions in the aqueous electrolyte is high, electrolysis of the aqueous solvent at the negative electrode tends to be suppressed, and thus, there is a tendency that the hydrogen generation from the negative electrode is little.

The first aqueous electrolyte contains zinc ions. The concentration of the zinc ions contained in the first aqueous electrolyte is 0.001% by mass or more and 0.5% by mass or less. If the concentration of the zinc ions is excessively low, the zinc-containing coating film formed in the negative electrode will be too thin, and a sufficient water decomposition suppressing effect cannot be obtained. On the other hand, if the concentration of the zinc ions in the first aqueous electrolyte is excessively high, the zinc-containing coating film will be too thick. In this case, insertion and extraction of the lithium ions into and out from the negative electrode active material is inhibited, which will be a factor causing a reduction in charge-discharge capacity and a decline in efficiency.

The second aqueous electrolyte includes the first compound including the hydrophobic portion(s) and the hydrophilic portion(s) in the same molecule. The concentration of the first compound included in the second aqueous electrolyte falls within a range of 1% by mass or greater and 5% by mass or less. As described above, when the composite coating film is formed by an interaction between the first compound and zinc ions, the concentration of zinc ions in the first aqueous electrolyte is kept within the range of 0.001% by mass to 0.5% by mass.

The aqueous electrolyte may further contain a water-soluble organic solvent. As the water-soluble organic solvent contained in the aqueous electrolyte, for example, at least one selected from a group consisting of, for example, N-methyl-2-pyrrolidone (NMP), methanol, ethanol, propanol, isopropanol, butanol, isobutyl alcohol, sec-butyl alcohol, tert-butanol, ethylene glycol, 1,2-dimethoxyethane, tetrahydrofuran (THF), 1,4-dioxane, acetone, ethyl methyl ketone, acetonitrile (AN), dimethylformamide, hexamethylphosphate triamide, triethylamine, pyridine, and dimethyl sulfoxide may be used.

As described above, the positive electrode and the negative electrode may contain a binder. Compounds that may be used as a binder include those that are not compatible with the above-mentioned water-soluble organic solvents. Therefore, precaution is taken with regard to a binder used for an electrode (a positive electrode or a negative electrode) that may come in contact with an aqueous electrolyte containing a water-soluble organic solvent. For similar reasons, precaution is taken with regard to the hydrophobic polymer that can be included in the separator and the polymeric compound included in the gel electrolyte, in the case the water-soluble organic solvent is used.

A pH of the aqueous electrolyte is preferably 3 to 14, and more preferably 4 to 13. The pH is a value measured at 25° C. In addition, the pH of the first aqueous electrolyte on the negative electrode side is preferably 3 or greater, more preferably 5 or greater, and even more preferably 7 or greater. When the pH of the first aqueous electrolyte is 7 or greater, progress of a hydrogen generation reaction due to electrolysis of water at the negative electrode can be suppressed more efficiently. The pH of the third aqueous electrolyte on the positive electrode side is preferably within a range of 0 or greater and 7 or less, and more preferably 0 or greater and 6 or less. When the pH of the third aqueous electrolyte is 7 or less, progress of an oxygen generation reaction due to electrolysis of water at the positive electrode can be suppressed.

(5) Container Member

As the container member that houses the positive electrode, the negative electrode, and the aqueous electrolyte, a metal container, a laminated film container, or a resin container may be used.

As the metal container, a metal can made of nickel, iron, stainless steel, or the like and having a rectangular shape or a cylindrical shape may be used. As the resin container, a container made of polyethylene, polypropylene, or the like may be used.

The plate thickness of each of the resin container and the metal container preferably falls within the range of 0.05 mm to 1 mm. The plate thickness is more preferably 0.5 mm or less, and even more preferably 0.3 mm or less.

As the laminated film, for example, a multilayered film formed by covering a metal layer with a resin layer may be used. Examples of the metal layer include a stainless steel foil, an aluminum foil, and an aluminum alloy foil. As the resin layer, a polymer such as polypropylene (PP), polyethylene (PE), nylon, or polyethylene terephthalate (PET) may be used. The thickness of the laminated film preferably falls within the range of 0.01 mm to 0.5 mm. The thickness of the laminated film is more preferably 0.2 mm or less.

(6) Negative Electrode Terminal

The negative electrode terminal may be formed, for example, from a material that is electrochemically stable at the potential of alkali metal ion insertion-extraction for the negative active material and having electrical conductivity. Specifically, the material for the negative electrode terminal may include zinc, copper, nickel, stainless steel, aluminum, or an aluminum alloy containing at least one element selected from a group consisting of Mg, Ti, Zn, Mn, Fe, Cu, and Si. As the material for the negative electrode terminal, zinc or a zinc alloy is preferably used. In order to reduce the contact resistance between the negative electrode terminal and the negative electrode current collector, the negative electrode terminal is preferably made of the same material as that of the negative electrode current collector.

(7) Positive Electrode Terminal

The positive electrode terminal may be made, for example, from a material that is electrically stable in a potential range of 3 V to 4.5 V with respect to oxidation-reduction potential of lithium (vs. Li/Li$^+$) and having electrical conductivity. Examples of the material for the positive electrode terminal include titanium, aluminum, or an aluminum alloy containing at least one element selected from a group consisting of Mg, Ti, Zn, Mn, Fe, Cu, and Si. In order to reduce the contact resistance between the positive electrode terminal and the positive electrode current collector, the positive electrode terminal is preferably made of the same material as that of the positive electrode current collector.

The secondary battery according to the embodiment may be used in various forms such as a rectangular shape, a cylindrical shape, a flat form, a thin form, and a coin form. In addition, the secondary battery may be a secondary battery having a bipolar structure. A secondary battery having a bipolar structure has an advantage of being able to produce a cell with in-series connection of multiple, using a single cell.

Details of the secondary battery according to the embodiment will be described below with reference to FIGS. 4 and 5.

Figure 4:
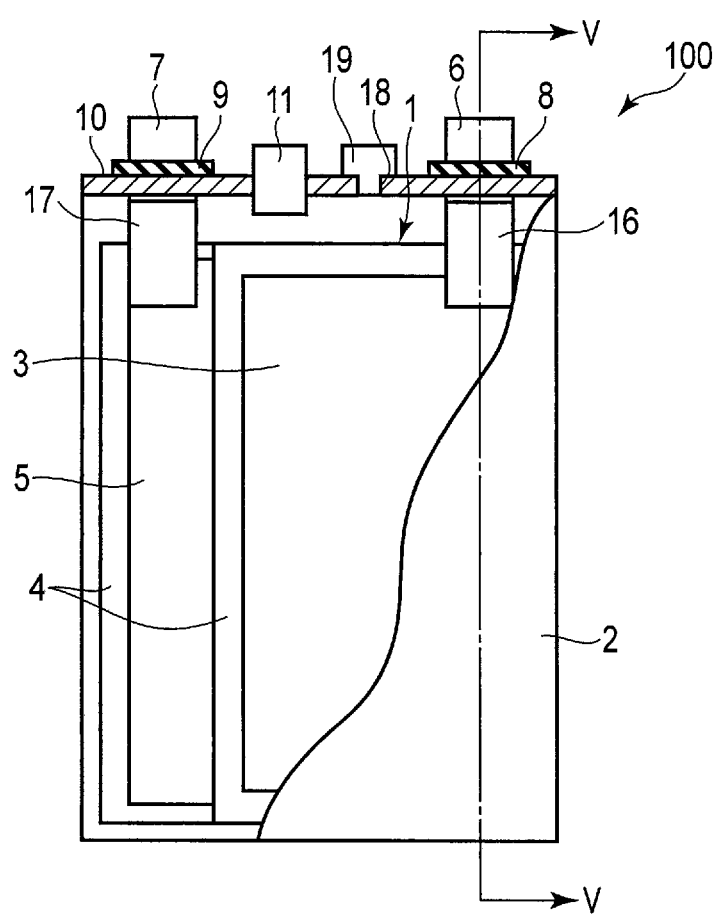
FIG. 4 is a sectional view schematically showing an example of the secondary battery according to an embodiment.
Figure 5:
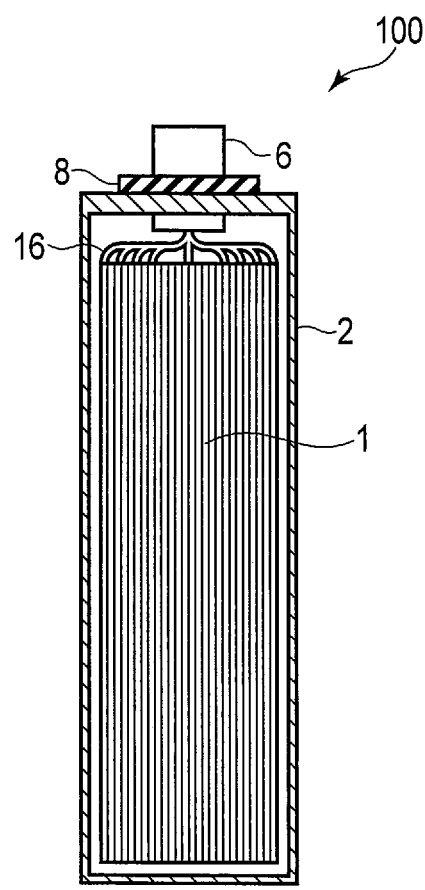
FIG. 5 is a sectional view of the secondary battery shown in FIG. 4 taken along a line V-V.

FIG. 4 is a sectional view schematically showing an example of the secondary battery according to the embodiment. FIG. 5 is a sectional view of the secondary battery shown in FIG. 4 taken along a line V-V.

An electrode group 1 is housed in a container member 2 made of a rectangular tubular metal container. The electrode group 1 includes a negative electrode 3, a separator 4, and a positive electrode 5. The electrode group 1 has a structure formed by spirally winding the positive electrode 5 and the negative electrode 3 with the separator 4 interposing therebetween so as to form a flat shape. An aqueous electrolyte (not shown) is held by the electrode group 1. In detail, the first aqueous electrolyte (not shown) is held in the negative electrode 3, the second aqueous electrolyte (not shown) is held in the separator 4, and the third aqueous electrolyte (not shown) is held in the positive electrode 5. As shown in FIG. 4, a strip-shaped negative electrode lead 16 is electrically connected to each of plural portions at an end of the negative electrode 5 located on an end face of the electrode group 1. In addition, a strip-shaped positive electrode lead 17 is electrically connected to each of plural portions at an end of the positive electrode 5 located on the end face. The plural negative electrode leads 16 are electrically connected to a negative electrode terminal 6 in a bundled state, as shown in FIG. 5. In addition, the plural positive electrode leads 17 are similarly electrically connected to a positive electrode terminal 7 in a bundled state, although not shown.

A sealing plate 10 made of metal is fixed to the opening portion of the container member 2 made of metal by welding or the like. The negative electrode terminal 6 and the positive electrode terminal 7 are extracted to the outside from outlet holes provided in the sealing plate 10, respectively. On the inner surfaces of the outlet holes of the sealing plate 10, a negative electrode gasket 8 and a positive electrode gasket 9 are arranged to avoid a short circuit caused by contact respective with the negative electrode terminal 6 and the positive electrode terminal 7. By providing the negative electrode gasket 8 and the positive electrode gasket 19, the airtightness of the secondary battery 100 can be maintained.

A control valve 11 (safety valve) is provided on the sealing plate 10. When the internal pressure of the battery cell is raised by gas generated by electrolysis of the aqueous solvent, the generated gas can be released from the control valve 11 to the outside. As the control valve 11 there may be used, for example, a return type valve that operates when the internal pressure exceeds a predetermined value and functions as a sealing plug when the internal pressure lowers. Alternatively, there may be used a non-return type valve that cannot recover the function as a sealing plug once it operates. In FIG. 4, the control valve 11 is disposed at the center of the sealing plate 10. However, the position of the control valve 11 may be an end of the sealing plate 10. The control valve 11 may be omitted.

Additionally, an inlet 18 is provided on the sealing plate 10. The aqueous electrolyte may be put in via the inlet 18. The inlet 18 may be closed with a sealing plug 19 after the aqueous electrolyte is put in. The inlet 18 and the sealing plug 19 may be omitted.

Figure 6:
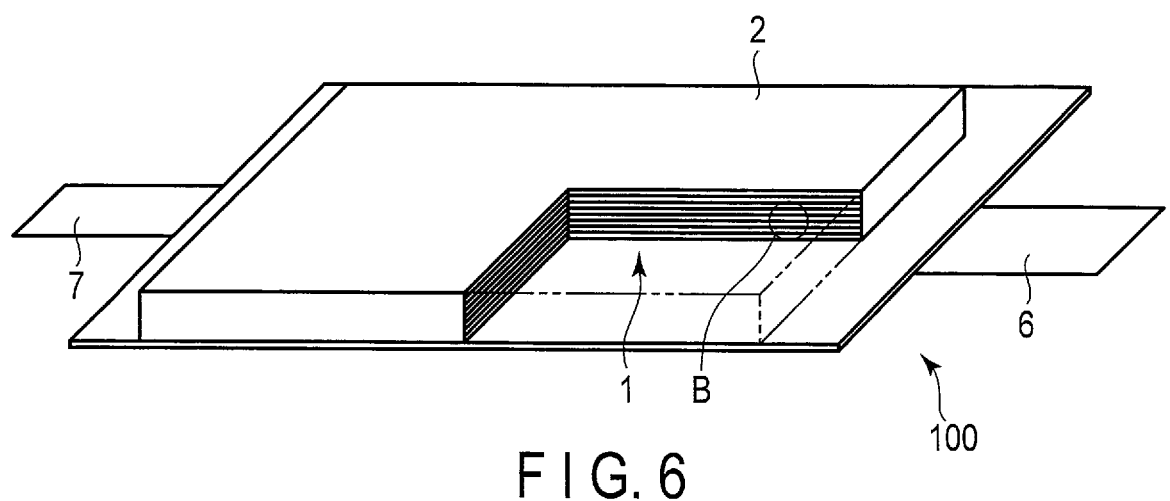
FIG. 6 is a partially cut perspective view schematically showing another example of the secondary battery according to the embodiment.
Figure 7:
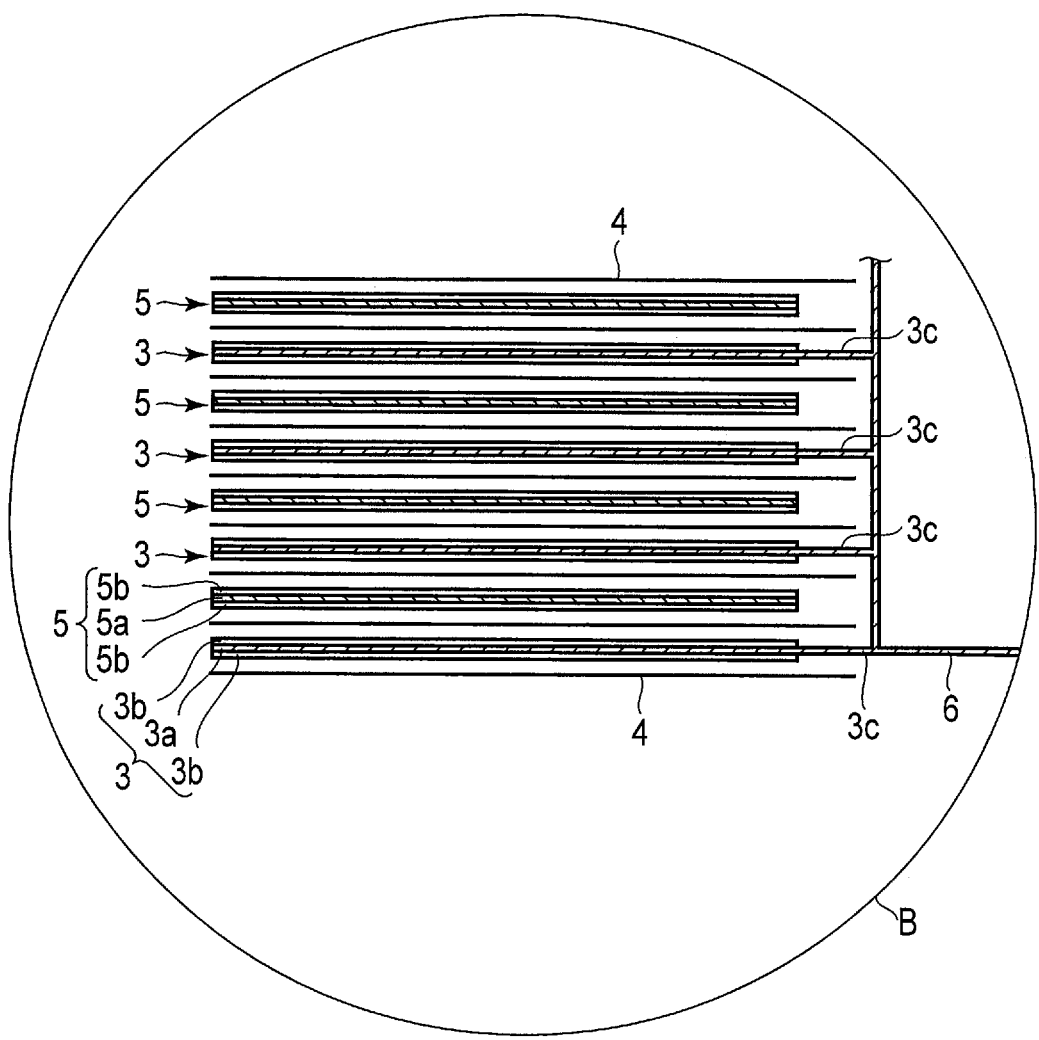
FIG. 7 is an enlarged sectional view showing section B of the secondary battery shown in FIG. 6.

FIG. 6 is a partially cut out perspective view schematically showing another example of the secondary battery according to the embodiment. FIG. 7 is an enlarged sectional view of section B of the secondary battery shown in FIG. 6.

FIG. 6 and FIG. 7 show an example of the secondary battery 100 using a laminated film container member as a container.

The secondary battery 100 shown in FIGS. 6 and 7 includes an electrode group 1 shown in FIGS. 6 and 7, a container member 2 shown in FIG. 6, and an aqueous electrolyte, which is not shown. The electrode group 1 and the aqueous electrolyte are housed in the container member 2. The aqueous electrolyte is held in the electrode group 1. In detail, the first aqueous electrolyte (not shown) is held in the negative electrode 3, the second aqueous electrolyte (not shown) is held in the separator 4, and the third aqueous electrolyte (not shown) is held in the positive electrode 5.

The container member 2 is made of a laminated film including two resin layers and a metal layer sandwiched between the resin layers.

As shown in FIG. 7, the electrode group 1 is a stacked electrode group. The stacked electrode group 1 has a structure in which negative electrodes 3 and positive electrodes 5 are alternately stacked with separator(s) 4 sandwiched therebetween.

The electrode group 1 includes plural negative electrodes 3. Each of the negative electrodes 3 includes a negative electrode current collector 3a and negative electrode active material-containing layers 3b supported on both surfaces of the negative electrode current collector 3a. The electrode group 1 further includes plural positive electrodes 5. Each of the positive electrodes 5 includes a positive electrode current collector 5a and positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on any surface. The portion 3c serves as a negative electrode current collecting tab. As shown in FIG. 7, the portion 3c serving as the negative electrode current collecting tab 3c does not overlap the positive electrode 5. Plural negative electrode current collecting tabs (portions 3c) are electrically connected to a belt-shaped negative electrode terminal 6. A leading end of the belt-shaped negative electrode terminal 6 is drawn to the outside from the container member 2.

Although not shown, the positive electrode current collector 5a of each of the positive electrodes 5 includes at one end a portion where the positive electrode active material-containing layer 5b is not supported on any surface. This portion serves as a positive electrode current collecting tab. Like the negative electrode current collecting tab (portion 3c), the positive electrode current collecting tab does not overlap the negative electrode 3. Further, the positive electrode current collecting tab is located on the opposite side of the electrode group 1 with respect to the negative electrode current collecting tab (portion 3c). The positive electrode current collecting tab is electrically connected to a belt-shaped positive electrode terminal 7. A leading end of the belt-shaped positive electrode terminal 7 is located on the opposite side of the negative electrode terminal 6 and drawn to the outside from the container member 2.

Figure 8:
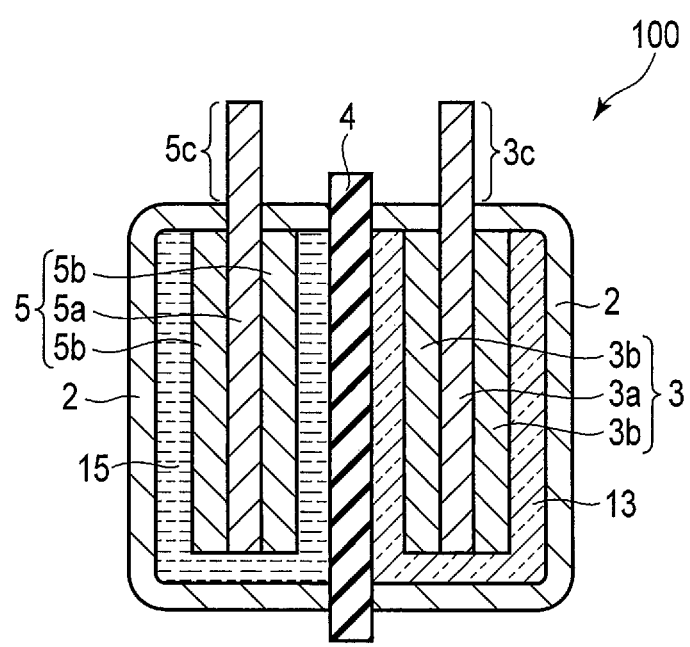
FIG. 8 is a sectional view schematically showing yet another example of the secondary battery according to the embodiment.

FIG. 8 is a sectional view schematically showing yet another example of the secondary battery according to the embodiment.

The secondary battery 100 shown in FIG. 8 includes a negative electrode 3, a separator 4, a positive electrode 5, a first aqueous electrolyte 13, a second aqueous electrolyte (not shown), a third aqueous electrolyte 15, and a container member 2. The negative electrode 3 includes a negative electrode current collector 3a and negative electrode active material-containing layers 3b provided on part of both surfaces of the negative electrode current collector 3a. The negative electrode current collector 3a includes a portion 3c which is not covered with the negative electrode active material-containing layer 3b. The portion 3c serves as a negative electrode current collecting tab. The positive electrode 5 includes a positive electrode current collector 5a and positive electrode active material-containing layers 5b provided on part of both surfaces of the positive electrode current collector 5a. The positive electrode current collector 5a includes a portion 5c which is not covered with the positive electrode active material-containing layer 5b. The portion 5c serves as a positive electrode current collecting tab.

The negative electrode 3 is housed in the container member 2 in a state in which the portion 3c serving as the negative electrode current collecting tab projects outside. The positive electrode 5 is housed in the container member 2 in a state in which the portion 5c serving as the positive electrode current collecting tab projects outside.

The first aqueous electrolyte 13 is housed in the container member 2 in a state (not shown) where a portion thereof is held in the negative electrode 3. The second aqueous electrolyte is held in the separator 4 (not shown). The third aqueous electrolyte 15 is housed in the container member 2 in a state (not shown) where a portion thereof is held in the positive electrode 5. FIG. 8 shows an example, in which the first aqueous electrolyte 13 and the third aqueous electrolyte 15 are liquid.

As shown in FIG. 8, the separator 4 may extend from the inside to the outside of the container member 2, or may be provided within the container member 2.

(Measurement of Aqueous Electrolyte)

Methods for measuring the properties of the aqueous electrolyte will be described below.

When the aqueous electrolyte to be measured is included in, for example, an assembled battery, the aqueous electrolyte is extracted in the manner described below. After the battery is discharged, the battery is disassembled, and an electrode group is extracted. The first aqueous electrolyte, the second aqueous electrolyte, and the third aqueous electrolyte respectively included in the negative electrode, the separator, and the positive electrode of the electrode group are extracted, and measurement samples are obtained.

<Measurement of Concentration of Zinc Ions>

The concentration of zinc ions contained in the aqueous electrolyte can be measured by ICP emission spectrometry. The molar concentration (mol/L) can be calculated by measuring a predetermined amount of the aqueous electrolyte and calculating the concentration of contained zinc ions.

<Measurements of the Water-Soluble Organic Solvent and First Compound>

The identification and quantification of the water-soluble organic solvent and first compound in an aqueous electrolyte can be carried out by liquid chromatography-mass spectrometry (LC/MS) analysis.

The electrolyte is extracted as described above. By analyzing the extracted electrolyte by LC/MS, components in the electrolyte, for example, the organic solvent and the first compound can be identified and quantified.

<Measurement of Molecular Weight of First Compound>

The molecular weight of the first compound can be measured by the matrix assisted laser desorption/ionization time-of-flight mass spectrometry (MALDI-TOF-MS) analysis. As an apparatus, for example, JMS-S3000 Spiral TOF manufactured by JEOL Ltd. may be used. For data analysis, for example, MS Tornado Analysis manufactured by JEOL Ltd. may be used. For an external standard of a mass configuration, polymethyl methacrylate (molecular weight standards for size-exclusion chromatography) is used.

A value of a position of a peak top in an MALDI-MS spectrum is recorded as the molecular weight.

<Measurement Method of pH of Aqueous Electrolyte>

The measurement method of the pH of the aqueous electrolyte is as follows. The electrolytes (first to third aqueous electrolytes) respectively contained in each electrode and separator of the electrode group taken out from the disassembled battery are extracted, and after measuring the liquid amount, a pH value is measured using a pH meter. The pH measurement is performed, for example, as follows. For the measurement, F-74 manufactured by Horiba Seisakusho Co., Ltd. is used, for example. First, standard solutions of pH 4.0, 7.0, and 9.0 are prepared. Next, using these standard solutions, the F-74 is calibrated. An appropriately prepared amount of the electrolyte (electrolytic solution) to be measured is put in a container, and the pH is measured. After measuring the pH, the sensors of the F-74 are washed. When measuring a different subject for measurement, the above procedures, namely, the calibration, measurement, and washing are performed for each subject.

<Calculation of Polyoxyalkylene Unit Ratios in Nonionic Surfactant>

A ratio of oxyethylene groups and various polyoxyalkylene units included in oxyalkylene groups of the nonionic surfactant as the first compound can be calculated by the following method based on a proton nuclear magnetic resonance ($^1$H NMR) spectrometry. As a sample for subjecting to $^1$H NMR measurement, for example, a liquid electrolyte extracted from a battery can be used as is.

$^1$H NMR spectrum of the electrolyte is measured. Peaks in the obtained spectrum can be assigned for each alkylene oxide unit according to a chemical shift, a splitting pattern, etc. An integral ratio is calculated with respect to peaks assigned to alkylene oxide units, and based on this value, a ratio of alkylene oxides is obtained. For example, respective peaks that appear in the $^1$H NMR spectrum obtained by measuring a sample including polyoxyalkylene alkyl ether represented by chemical formula $C_{12}H_{25}O[(CH_2CH(CH_3)O)_m.(CH_2CH_2O)_n]H$ include peaks assignable to the alkyl group ($C_{12}H_{25}$—), the propylene oxide unit (—$CH_2CH(CH_3)O$)—), or the ethylene oxide unit (—$CH_2CH_2O$)—). By calculating an integral ratio among the respective assigned peaks, ratio of subscripts m and n can be determined.

(Measurement of Separator)

Methods for measuring the separator will be described below.

When the separator to be measured is included in, for example, an assembled battery, the separator is extracted in the manner described below. After the battery is discharged, the battery is disassembled, and the electrode group is taken out. The separator is removed from the electrode group. Both surfaces of the separator are washed with pure water, and thereafter the separator is immersed in pure water and left at rest for 48 hours or longer. Then, both surfaces are further washed with pure water, and the separator is dried in a vacuum drying oven at 100° C. for 48 hours or longer. Thereafter, various measurements are performed.

<Measurement Method of Coefficient of Air Permeability of Separator>

The coefficient of air permeability (m$^2$) of the separator is calculated as follows. In the calculation of the coefficient of air permeability KT, for example, in a case in which a separator having a thickness L (m) is to be measured, a gas having a viscosity coefficient of σ(Pa·s) is passed through a range of measurement area A (m$^2$). At this time, the gas is made to pass through under plural conditions in which the pressures p (Pa) of the gases introduced are different from each other, and the gas amount Q (m$^3$/s) passed through the separator is measured under each of the plural conditions. Thereafter, the gas amount Q with respect to the pressure p is plotted from the measurement results to determine dQ/dp, which is the slope. Thereafter, the coefficient of air permeability KT is calculated as in Equation (1) from the thickness L, the measurement area A, the coefficient of viscosity σ, and the slope dQ/dp.

$$KT=((\sigma \cdot L)/A) \times (dQ/dP) \qquad (1)$$

In an example of the method for calculating the coefficient of air permeability KT, a separator is sandwiched between a pair of stainless steel plates each equipped with a hole having a diameter of 10 mm. Thereafter, air is sent through the hole of one stainless steel plate at a pressure p. Thereafter, the gas amount Q of the air leaking through the hole of the other stainless steel plate is measured. Hence, the area of the hole (25π mm$^2$) is used as the measurement area A, and 0.000018 Pa·s is used as the coefficient of viscosity σ. Moreover, the gas amount Q is calculated by measuring the amount δ (m$^3$) leaking through the hole during 100 seconds and dividing the measured amount δ by 100.

Thereafter, at four points at which the pressure p differ from one another by at least 1000 Pa, the gas amount Q with respect to the pressure p is measured in the manner described above. For example, the gas amount Q with respect to the pressure p is measured at each of four points at which the pressure p is 1000 Pa, 2500 Pa, 4000 Pa, and 6000 Pa. Thereafter, the gas amount Q with respect to the pressure p at the four measured points is plotted and the slope (dQ/dp) of the gas amount Q with respect to the pressure p is calculated by straight line fitting (least squares method). Thereafter, the coefficient of air permeability KT is calculated by multiplying the calculated slope (dQ/dp) by (σ·L)/A.

The coefficient of air permeability is measured at arbitrary plural places of the separator. A value at a place at which the coefficient of air permeability is the lowest value among the arbitrary plural places is taken as the coefficient of air permeability of the separator.

<Measurement Method of Lithium Ion Conductivity of Inorganic Solid Particles>

Measurement of the lithium ion conductivity of the inorganic solid particles by the alternating-current impedance method will be explained. First, the inorganic solid particles are molded using a tablet-making machine, whereby a pressed powder body is obtained. Gold (Au) is deposited onto both surfaces of this pressed powder body, whereby a measurement sample is obtained. The alternating-current impedance of the measurement sample is measured by using an impedance measurement apparatus. As the measurement apparatus, model 1260 Frequency Response Analyzer manufactured by Solartron may be used, for example. The measurement is performed over a measurement frequency range of 5 Hz to 32 MHz at a temperature of 25° C. under argon atmosphere.

Subsequently, based on the measured alternating-current impedance, a complex impedance plot is prepared. The complex impedance plot involves plotting an imaginary component on a vertical axis and a real component on a horizontal axis. Ionic conductivity $\sigma_{Li}$ of the inorganic solid particles is calculated by equation (2) below. In the following equation, $Z_{Li}$ is a resistance value calculated from a diameter of an arc of the complex impedance plot, S is an area, and d is a thickness.

$$\sigma_{Li} = (1/Z_{Li}) \times (d/S) \qquad (2)$$

The secondary battery according to the first embodiment includes a negative electrode containing a titanium-containing oxide, a positive electrode, a separator between the negative electrode and the positive electrode, and an aqueous electrolyte. The aqueous electrolyte includes a first aqueous electrolyte held in the negative electrode, a second aqueous electrolyte held in the separator, and a third aqueous electrolyte held in the positive electrode. The first aqueous electrolyte in the negative electrode contains 0.001% by mass to 0.5% by mass of zinc ions. The second aqueous electrolyte in the separator contains 1% by mass to 5% by mass of a first compound that includes a hydrophobic portion and a hydrophilic portion within the same molecule. With the secondary battery, since electrolysis of water is suppressed at the negative electrode, excellent charge-discharge efficiency and excellent discharge capacity are exhibited.

Second Embodiment

According to a second embodiment, a battery module is provided. The battery module includes plural of secondary batteries according to the first embodiment.

In the battery module, each of the single-batteries may be arranged to be electrically connected in series or in parallel, or may be arranged in combination of in-series connection and in-parallel connection.

An example of the battery module will be described next with reference to the drawings.

FIG. 9 is a perspective view schematically showing an example of the battery module. The battery module 200 shown in FIG. 9 includes five single-batteries 100a to 100e, four bus bars 21, a positive electrode-side lead 22, and a negative electrode-side lead 23. Each of the five single-batteries 100a to 100e is the secondary battery according to the first embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 9 is a battery module of five in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 7 of at least one battery among the five single-batteries 100a to 100e is electrically connected to the positive electrode-side lead 22 for external connection. In addition, the negative electrode terminal 6 of at least one battery among the five single-batteries 100a to 100e is electrically connected to the negative electrode-side lead 23 for external connection.

The battery module according to the embodiment includes a secondary battery according to an embodiment. Therefore, the battery module can exhibit excellent charge-discharge efficiency and excellent discharge capacity.

Third Embodiment

According to a third embodiment, provided is a battery pack including the secondary battery according to the first embodiment. The battery pack may include a battery module according to the second embodiment. The battery pack may include a single secondary battery according to the first embodiment, in place of the battery module according to the second embodiment.

The battery pack may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack may further include an external power distribution terminal. The external power distribution terminal is configured to externally output electric current from the secondary battery, and/or to input external electric current into the secondary battery. In other words, when the battery pack is used as a power source, electric current is provided out via the external power distribution terminal. When the battery pack is charged, the charging current (including regenerative energy of motive force of vehicles such as automobiles) is provided to the battery pack via the external power distribution terminal.

Next, an example of a battery pack according to the embodiment will be described with reference to the drawings.

Figure 10:
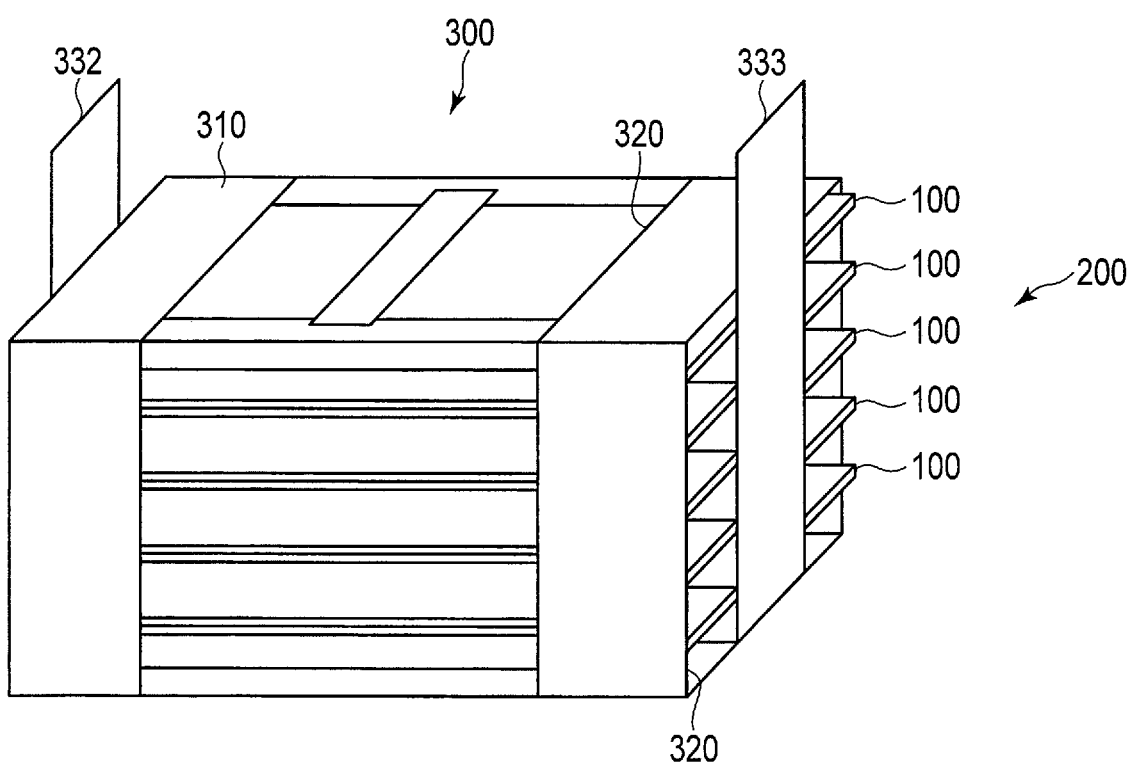
FIG. 10 is a perspective view schematically showing an example of a battery pack according to an embodiment.

FIG. 10 is a perspective view schematically showing an example of the battery pack according to the embodiment.

A battery pack 300 includes a battery module configured of the secondary battery shown in FIGS. 6 and 7. The battery pack 300 includes a housing 310, and a battery module 200 housed in the housing 310. In the battery module 200, plural (for example, five) secondary batteries 100 are electrically connected in series. The secondary batteries 100 are stacked in a thickness direction. The housing 310 has an opening 320 on each of an upper portion and four side surfaces. The side surfaces, from which the positive and negative electrode terminals 6 and 7 of the secondary batteries 100 protrude, are exposed through the opening 320 of the housing 310. A positive electrode terminal 332 for output of the battery module 200 is belt-shaped, and one end thereof is electrically connected to any or all of the positive electrode terminals 7 of the secondary batteries 100, while the other end protrudes beyond the opening 320 of the housing 310 and thus protrudes past the upper portion of the housing 310. Meanwhile, a negative electrode terminal 333 for output of the battery module 200 is belt-shaped, and one end thereof is electrically connected to any or all of the negative electrode terminals 6 of the secondary batteries 100, while the other end protrudes beyond the opening 320 of the housing 310 and thus protrudes past the upper portion of the housing 310.

Figure 11:
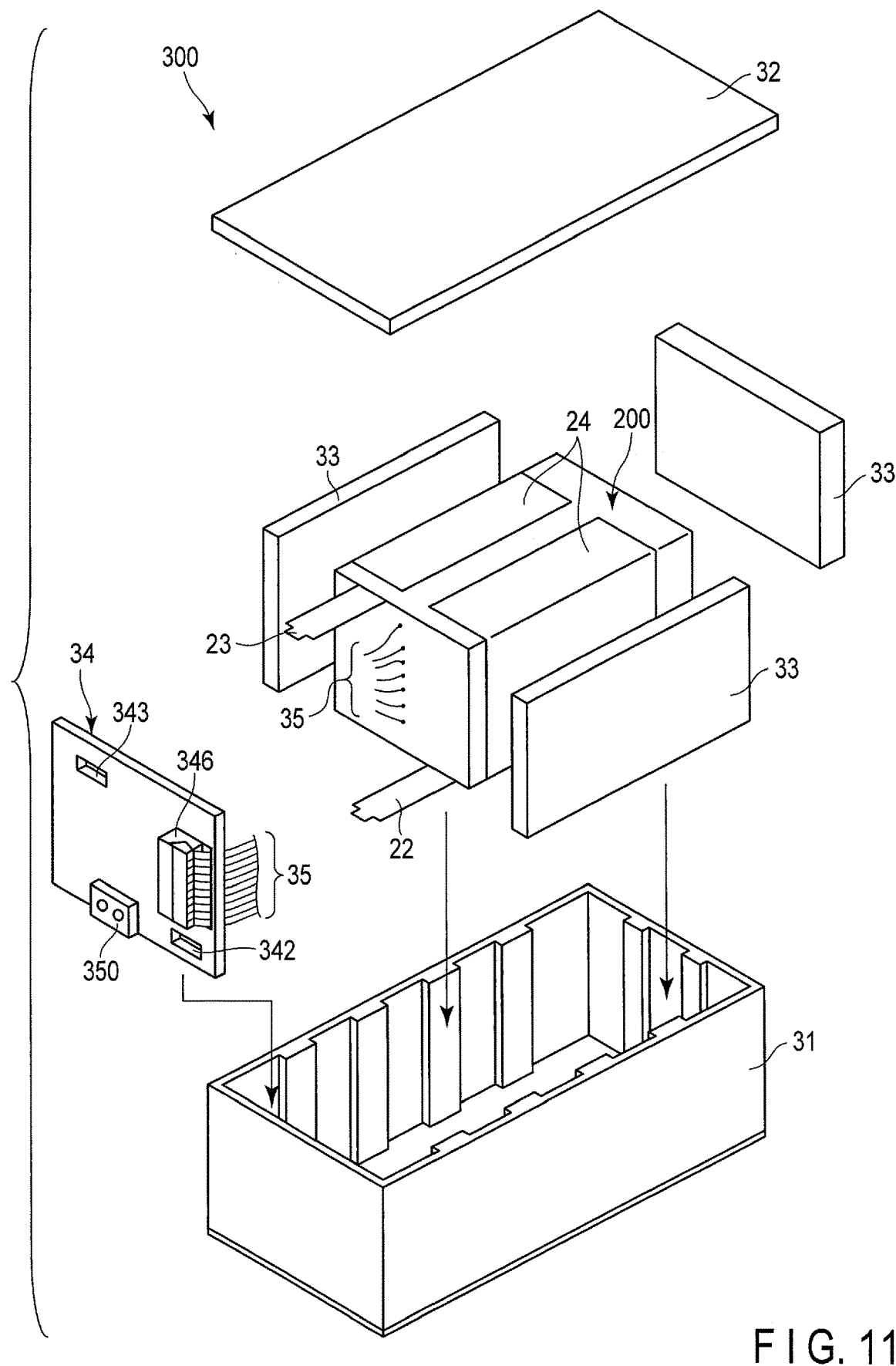
FIG. 11 is an exploded perspective view schematically showing another example of the battery pack according to the embodiment.

Another example of the battery pack is explained in detail with reference to FIG. 11 and FIG. 12. FIG. 11 is an exploded perspective view schematically showing another example of the battery pack according to the embodiment. FIG. 12 is a block diagram showing an example of an electric circuit of the battery pack shown in FIG. 11.

A battery pack 300 shown in FIGS. 11 and 12 includes a housing container 31, a lid 32, protective sheets 33, a battery module 200, a printed wiring board 34, wires 35, and an insulating plate (not shown).

The housing container 31 shown in FIG. 11 is a square-bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a secondary battery according to the embodiment. The plural single-batteries 100 are electrically connected in series, as shown in FIG. 12. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode (s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side wiring (positive-side wiring) 348a, and a minus-side wiring (negative-side wiring) 348b. One principal surface of the printed wiring board 34 faces one side surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode-side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of overcharge, over-discharge, and overcurrent of the single-battery(s) 100. When detecting over charge or the like for each of the single-batteries 100, the battery voltage may be detected, or a positive electrode potential or negative electrode potential may be detected. In the latter case, a lithium electrode to be used as a reference electrode may be inserted into each single-battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output electric current from the battery module 200 to an external device and input electric current from an external device to the battery module 200 via the external power distribution terminal 350. In other words, when using the battery pack 300 as a power source, the electric current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal and negative-side terminal of the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the third embodiment is provided with the secondary battery according to the first embodiment or the battery module according to the second embodiment. Accordingly, the battery pack can exhibit excellent charge-discharge efficiency and excellent discharge capacity.

Fourth Embodiment

According to a fourth embodiment, provided is a vehicle including the battery pack according to the third embodiment. In the vehicle, the battery pack is configured, for example, to recover regenerative energy from motive force of the vehicle. The vehicle may include a mechanism (e.g., a regenerator) for converting kinetic energy of the vehicle into regenerative energy.

Examples of the vehicle according to the embodiment include two- to four-wheeled hybrid electric automobiles, two- to four-wheeled electric automobiles, power assisted bicycles, and railway cars.

In the vehicle according to the embodiment, the installing position of the battery pack is not particularly limited. For example, the battery pack may be installed in the engine compartment of the vehicle, in rear parts of the vehicle, or under seats.

The vehicle according to the embodiment may have plural battery packs installed thereon. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

Next, an example of the vehicle according to the embodiment will be described with reference to the drawings.

FIG. 13 is a partially see-through diagram schematically showing an example of a vehicle according to the embodiment.

The vehicle 400 shown in FIG. 13 includes a vehicle body 40 and a battery pack 300 according to the third embodiment. In the example shown in FIG. 13, the vehicle 400 is a four-wheeled automobile.

This vehicle 400 may have plural battery packs 300 installed. In such a case, the batteries (single-batteries or battery modules) included in the battery packs 300 may be connected in series, connected in parallel, or connected in a combination of in-series connection and in-parallel connection.

In FIG. 13, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

The vehicle according to the fourth embodiment has the battery pack according to the third embodiment installed therein. Therefore, the vehicle is excellent in drive performance.

Fifth Embodiment

According to a fifth embodiment, provided is a stationary power supply including the battery pack according to the third embodiment.

The stationary power supply may have the battery module according to the second embodiment or the secondary battery according to the first embodiment installed therein, instead of the battery pack according to the third embodiment. The stationary power supply according to the embodiment can realize high efficiency and high capacity.

FIG. 14 is a block diagram showing an example of a system including the stationary power supply according to the embodiment. FIG. 14 is a diagram showing an application example to stationary power supplies 112, 123 as an example of use of battery packs 300A, 300B according to an embodiment. In the example shown in FIG. 14, shown is a system 110 in which the stationary power supplies 112, 123 are used. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large capacity of electric power from fuel sources such as thermal power or nuclear power. Electric power is supplied from the electric power plant 111 through the electric power network 116 and the like. In addition, the battery pack 300A is installed in the stationary power supply 112. The battery pack 300A can store electric power and the like supplied from the electric power plant 111. In addition, the stationary power supply 112 can supply the electric power stored in the battery pack 300A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 300A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 300B is installed in the stationary power supply 123. The customer side EMS 121 performs control to stabilize the customer side electric power system 113.

Electric power from the electric power plant 111 and electric power from the battery pack 300A are supplied to the customer side electric power system 113 through the electric power network 116. The battery pack 300B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 300B.

Note that the electric power stored in the battery pack 300B can be used, for example, for charging a vehicle such as an electric automobile. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

EXAMPLES

Examples are explained below, but the embodiments are not limited to examples described below.

Example 1

<Production of Positive Electrode>

$LiMn_2O_4$ as positive electrode active material, acetylene black as electro-conductive agent, PVDF as binder, and NMP as solvent were mixed to prepare a slurry. A mass ratio of the positive electrode active material, electro-conductive agent, and binder in the slurry was 100:5:10. The slurry was applied onto one surface of a Ti foil having a thickness of 20 μm. Then, the solvent was evaporated off to obtain a stack. Next, the stack was press-rolled. Thereafter, the stack was dried to obtain a positive electrode.

<Production of Negative Electrode>

$Li_4Ti_5O_{12}$ as negative electrode active material, graphite as electro-conductive agent, PVDF as binder, and NMP as solvent were mixed to prepare a slurry. A mass ratio of the negative electrode active material, electro-conductive agent, and binder in the slurry was 100:10:10. The slurry was applied onto one surface of a Zn foil having a thickness of 30 μm. Then, the solvent was vaporized off to obtain a stack. Next, the stack was press-rolled. Thereafter, the stack was dried to obtain a negative electrode.

<Preparation of First and Third Aqueous Electrolytes>

The first compound and zinc chloride were added to a 12 mol/L aqueous solution of lithium chloride, thereby preparing the first aqueous electrolyte to be included in the negative electrode side. As the first compound, polyoxyalkylene alkyl ether expressed by the chemical formula shown in FIG. 2, where the subscript m is 40 and the subscript n is 10 (hereinafter referred to as "Compound A") was used. Specifically, as the first aqueous electrolyte, a 12 mol/L lithium chloride solution containing 1% by mass of Compound A and 0.0033% by mass of zinc ions, was prepared.

As the third aqueous electrolyte to be included in the positive electrode side, similarly to the first aqueous electrolyte, a 12 mol/L aqueous lithium chloride solution containing 1% by mass of Compound A and 0.0033% by mass of zinc ions was prepared.

<Pretreatment of Separator>

Compound A (1 part by mass) as the first compound was added to a 12 mol/L lithium chloride aqueous solution (99 part by mass), thereby preparing the second aqueous electrolyte to be included in the separator. In other words, a 12 mol/L lithium chloride aqueous solution containing 1 part by mass of Compound A was obtained as the second aqueous electrolyte.

As the separator, a membrane formed of inorganic solid particles and hydrophobic polymer was prepared. The separator included a $Li_{1.3}Al_{0.3}Ti_{1.7}(PO_4)_3$ (LATP) solid electrolyte as the inorganic solid particles, and polyvinyl butyral as the hydrophobic polymer. The separator was immersed in and impregnated overnight with the second aqueous electrolyte prepared above.

<Production of Evaluation Cell>

A negative electrode lead was fixed on a plastic plate, and the negative electrode was fixed on the negative electrode lead. Here, the current collector (Zn foil) side of the negative electrode was brought into contact with the negative electrode lead. A positive electrode lead was fixed on another plastic plate, and the positive electrode was fixed on the positive electrode lead. Here, the current collector (Ti foil) side of the positive electrode was brought into contact with the positive electrode lead. The first aqueous electrolyte was applied dropwise onto the negative electrode active material-containing layer, and the pretreated separator (LATP solid electrolyte membrane) was placed thereon and brought into close contact therewith. The third aqueous electrolyte was applied dropwise onto the reverse side of the same separator with respect to the side in close contact with the negative electrode. The positive electrode was placed thereon, bringing the positive electrode active material-containing layer into close contact therewith. Further, the two plastic plates were fixed to one another with screws. The resultant assembly was left at rest for 24 hours. In this manner, an evaluation cell was obtained.

Example 2

An evaluation cell was produced in the same manner as in Example 1, except that the compositions of the first aqueous electrolyte and the third aqueous electrolyte were changed as follows. As the first and third aqueous electrolytes, a 12 mol/L aqueous solution of lithium chloride was prepared, in which Compound A was not contained and the content of zinc ions was changed to 0.001% by mass.

Example 3

An evaluation cell was produced in the same manner as in Example 1, except that the negative electrode current collector was changed to an aluminum foil, and the compositions of the first aqueous electrolyte, the second aqueous electrolyte, and the third aqueous electrolyte were changed as follows.

As the first and third aqueous electrolytes, a 12 mol/L aqueous solution of lithium chloride was used, in which the first compound was not contained, the content of the zinc ions was changed to 0.5% by mass, and 10% by volume of N-methyl-2-pyrrolidone (NMP) was contained. As the second aqueous electrolyte, a 12 mol/L aqueous solution containing as the first compound, 5% by mass of polyoxyalkylene alkyl ether expressed by the chemical formula shown in FIG. 3, where the subscript m is 28 and the subscript n is 35 (hereinafter referred to as "Compound B"), was used.

Comparative Example 1

An evaluation cell was produced in the same manner as in Example 1, except that the second aqueous electrolyte was not used and the pretreatment of the separator was not performed.

Specifically, the evaluation cell was produced in the following manner. After the first aqueous electrolyte was applied dropwise onto the negative electrode active material-containing layer, a LATP solid electrolyte membrane, which had not been pretreated, was placed as the separator thereon and brought into close contact therewith. The third aqueous electrolyte was applied dropwise onto the reverse side of the same separator with respect to the side in close contact with the negative electrode. The positive electrode was placed on the separator, bringing the positive electrode active material-containing layer into close contact therewith. Further, the two plastic plates were fixed to one another with screws. The resultant assembly was left at rest for 24 hours.

Comparative Example 2

An evaluation cell was produced in the same manner as in Example 1, except that after the cell was assembled, the cell was subjected to vacuum impregnation of the first and third aqueous electrolytes into the separator, instead of performing the pretreatment of the separator using the second aqueous electrolyte.

Specifically, the evaluation cell was produced in the following manner. After the first aqueous electrolyte was applied dropwise onto the negative electrode active material-containing layer, a LATP solid electrolyte membrane, which had not been pretreated, was placed as the separator thereon and brought into close contact therewith. The third aqueous electrolyte was applied dropwise onto the reverse side of the same separator with respect to the side in close contact with the negative electrode. The positive electrode was placed on the separator, bringing the positive electrode active material-containing layer into close contact therewith. Further, the two plastic plates were fixed to one another with screws. Then, the assembled cell was left at rest for 24 hours under vacuum. After 24 hours, the cell was removed from the vacuum, and an evaluation cell was obtained.

Comparative Example 3

An evaluation cell was produced in the same manner as in Example 1, except that the negative electrode current collector was changed to an aluminum foil, and the zinc ion contents in the first aqueous electrolyte and the third aqueous electrolyte were changed to 0% by mass.

Comparative Example 4

An evaluation cell was produced in the same manner as in Example 1, except that the negative electrode current collector was changed to an aluminum foil, and the zinc ion contents in the first aqueous electrolyte and the third aqueous electrolyte were changed to 1% by mass.

Tables 1 and 2 below summarize the production conditions in Examples 1 to 3 and Comparative Examples 1 to 4. Table 1 summarizes details of the production of the negative electrode. Table 2 summarizes details of the production of the separator. Specifically, Table 1 shows the material of the negative electrode current collector, the first compound included in the electrolytic solution on the negative electrode side (the first aqueous electrolyte), the content (concentration) of the first compound, and the concentration of the zinc ions ($Zn^{2+}$) in the electrolytic solution on the negative electrode side. Table 2 shows the first compound included in the electrolytic solution for the separator (the second aqueous electrolyte) and content (concentration) thereof, and the means for impregnating the separator with the second aqueous electrolyte.

TABLE 1

| | Negative Electrode | | | |
|---|---|---|---|---|
| | Current Collector | First Compound | First Compound Concentration in First Aqueous Electrolyte (mass %) | $Zn^{2+}$ Concentration in First Aqueous Electrolyte (mass %) |
| Example 1 | Zn foil | A | 1 | 0.0033 |
| Example 2 | Zn foil | none | 0 | 0.001 |
| Example 3 | Al foil | none | 0 | 0.5 |
| Comparative Example 1 | Zn foil | A | 1 | 0.0033 |
| Comparative Example 2 | Zn foil | A | 1 | 0.0033 |
| Comparative Example 3 | Al foil | A | 1 | 0 |
| Comparative Example 4 | Al foil | A | 1 | 1 |

TABLE 2

| | Separator | | |
|---|---|---|---|
| | First Compound | First Compound Concentration in Second Aqueous Electrolyte (mass %) | Method of Impregnating with Second Aqueous Electrolyte |
| Example 1 | A | 1 | Pretreatment into Separator |
| Example 2 | A | 1 | Pretreatment into Separator |
| Example 3 | B | 5 | Pretreatment into Separator |
| Comparative Example 1 | (unused) | (unused) | (unused) |
| Comparative Example 2 | (unused) | (unused) | Vacuum impregnation after assembling cell |
| Comparative Example 3 | A | 1 | Pretreatment into Separator |
| Comparative Example 4 | A | 1 | Pretreatment into Separator |

<Evaluation of Cell>

A constant current charge and discharge test was conducted on the evaluation cell produced in each example and each comparative example.

<Constant Current Charge and Discharge Test>

Charge and discharge were both performed at a 0.5 C rate. When charged, the earliest condition was adopted as the termination condition among three conditions; the three conditions were, until the current value reached 0.25 C, until the charging time reached 132 minutes, and until the charging capacity reached 170 mAh/g. When discharged, 132 minutes after discharge had begun was adopted as the termination condition.

Assuming performing the charging once and performing the discharging once as one cycle of charging and discharging, charging and discharging was repeated 20 cycles. The charge capacity and the discharge capacity in each charge and discharge cycle were measured. The charge-discharge efficiency was calculated for each cycle according to Equation (3) from the obtained result.

$$\text{Charge-discharge efficiency (\%)} = 100\% \times \left\{ \begin{array}{c} \text{discharge} \\ \text{capacity} \\ (\text{mAh/g}) \end{array} \middle/ \begin{array}{c} \text{charge} \\ \text{capacity} \\ (\text{mAh/g}) \end{array} \right\} \quad (3)$$

The results of the constant current charge and discharge tests are shown in Table 3 below.

TABLE 3

|  | Charge-discharge efficiency (%) | Discharge Capacity (mAh/g) |
| --- | --- | --- |
| Example 1 | 97.4 | 165.7 |
| Example 2 | 95.4 | 156.8 |
| Example 3 | 97.1 | 147.0 |
| Comparative Example 1 | N/A | N/A |
| Comparative Example 2 | N/A | N/A |
| Comparative Example 3 | 89.5 | 111.9 |
| Comparative Example 4 | 47.2 | 4.9 |

In Table 3, the column of "Charge-discharge efficiency" indicates an average value in percentage of the charge-discharge efficiencies from the fifth cycle to the twentieth cycle measured in the constant current charge and discharge test described above. The column of "Discharge capacity" indicates an average value in percentage of the discharge capacities from the fifth cycle to the twentieth cycle measured in the constant current charge and discharge test described above. "N/A" stands for "not applicable", and indicates that the evaluation cell did not operate.

As shown in Table 3, the evaluation cells produced in Examples 1 to 3 achieved excellent charge-discharge efficiency and discharge capacity. In contrast, the evaluation cells produced in Comparative Examples 1 and 2 did not operate. It is presumed that in Comparative Examples 1 and 2, since the impregnation of the separator with the second aqueous electrolyte was insufficient, the evaluation cell could not operate.

In Comparative Examples 3 and 4, although the evaluation cell had operated, the charge-discharge efficiency and the charge capacity in the fifth and subsequent cycles were lower than those in the evaluation cells of Examples 1 to 3. With regard to Comparative Example 3, it is presumed that since the evaluation cell contained no zinc, the electrolysis reaction of water could not be suppressed and self-discharge had occurred. With regard to Comparative Example 4, it is presumed that since the zinc concentration in the first aqueous electrolyte was high, the zinc-containing coating film had excessively formed on the negative electrode, and as a result, the insertion and extraction of the lithium ions in the negative electrode were inhibited, whereby the battery performance had degraded.

As demonstrated above, by having the first aqueous electrolyte including 0.001% by mass to 0.5% by mass of zinc ions be included as the aqueous electrolyte on the negative electrode side, and having the second aqueous electrolyte including the 1% by mass to 5% by mass of the first compound be included in the separator, excellent charge-discharge efficiency and discharge capacity can be achieved.

According to at least one embodiment and example described above, a secondary battery is provided. The secondary battery includes a negative electrode containing a titanium-containing oxide, a positive electrode, a separator between the negative electrode and the positive electrode, a first aqueous electrolyte held in the negative electrode, a second aqueous electrolyte held in the separator, and a third aqueous electrolyte held in the positive electrode. The first aqueous electrolyte contains 0.001% by mass to 0.5% by mass of zinc ions. The second aqueous electrolyte contains 1% by mass to 5% by mass of a first compound that includes a hydrophobic portion and a hydrophilic portion within a molecule. As the secondary battery can suppress electrolysis of water at the negative electrode, the secondary battery exhibits excellent charge-discharge efficiency and discharge capacity. Further, the secondary battery can provide a battery pack exhibiting excellent charge-discharge efficiency and discharge capacity, and moreover, a vehicle and stationary power supply having the battery pack installed thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
   a negative electrode comprising a titanium-containing oxide;
   a positive electrode;
   a separator between the negative electrode and the positive electrode;
   a first aqueous electrolyte held in the negative electrode, the first aqueous electrolyte comprising 0.001% by mass to 0.5% by mass of zinc ions;
   a second aqueous electrolyte held in the separator, the second aqueous electrolyte comprising 1% by mass to 5% by mass of a first compound, the first compound including a hydrophobic portion and a hydrophilic portion; and
   a third aqueous electrolyte held in the positive electrode.

2. The secondary battery according to claim 1, wherein the first compound is a nonionic surfactant.

3. The secondary battery according to claim 2, wherein the nonionic surfactant comprises polyoxyalkylene alkyl ether.

4. The secondary battery according to claim 2, wherein the nonionic surfactant has a molecular weight within a range of 200 or more and 4000 or less.

5. The secondary battery according to claim 1, wherein the separator is hydrophobic.

6. The secondary battery according to claim 1, wherein the separator has lithium ion conductivity.

7. The secondary battery according to claim 5, wherein the separator comprises a membrane, the membrane comprising inorganic solid particles and hydrophobic polymers.

8. A battery pack comprising the secondary battery according to claim 1.

9. The battery pack according to claim 8, further comprising an external power distribution terminal and a protective circuit.

10. The battery pack according to claim 8, further comprising plural of the secondary battery, the secondary batteries being electrically connected in series, in parallel, or in combination of in-series connection and in-parallel connection.

11. A vehicle comprising the battery pack according to claim 8.

12. The vehicle according to claim 11, which comprises a mechanism configured to convert kinetic energy of the vehicle into regenerative energy.

13. A stationary power supply comprising the battery pack according to claim 12.

* * * * *